(12) United States Patent
Kobayashi et al.

(10) Patent No.: US 8,146,251 B2
(45) Date of Patent: Apr. 3, 2012

(54) METHOD OF MANUFACTURING CATALYTIC CONVERTERS

(75) Inventors: Naoyuki Kobayashi, Hiroshima (JP); Etsuo Kosaka, Hiroshima (JP); Kazuo Tanigawa, Hiroshima (JP)

(73) Assignee: Hirotec Corporation, Hiroshima-shi (JP)

( * ) Notice: Subject to any disclaimer, the term of this patent is extended or adjusted under 35 U.S.C. 154(b) by 1401 days.

(21) Appl. No.: 10/593,645

(22) PCT Filed: Mar. 17, 2005

(86) PCT No.: PCT/JP2005/004753
§ 371 (c)(1),
(2), (4) Date: Sep. 21, 2006

(87) PCT Pub. No.: WO2006/008855
PCT Pub. Date: Jan. 26, 2006

(65) Prior Publication Data
US 2007/0212269 A1    Sep. 13, 2007

(30) Foreign Application Priority Data
Mar. 25, 2004 (JP) ................. 2004-090410

(51) Int. Cl.
*B21D 51/16* (2006.01)
(52) U.S. Cl. .......................... 29/890; 72/121
(58) Field of Classification Search .......... 29/896.411, 29/896.412, 896.41, 896.4, 896.43, 890; 15/193, 198; 24/709.8, 707.6; 63/15; 300/21; 72/121
See application file for complete search history.

(56) References Cited

U.S. PATENT DOCUMENTS

| 6,769,281 | B2 * | 8/2004 | Irie et al. .......................... 72/121 |
| 7,111,392 | B2 * | 9/2006 | Irie et al. .......................... 29/890 |

FOREIGN PATENT DOCUMENTS

| EP | 1 344 911 A1 | 9/2003 |
| EP | 1 389 675 A2 | 2/2004 |
| JP | 10-141052 | 5/1998 |
| JP | 2001-107725 | 4/2001 |
| JP | 2003-3837 | 1/2003 |
| JP | 2003-286836 | 10/2003 |
| JP | 2003-343255 | 12/2003 |

OTHER PUBLICATIONS

Supplementary European Search Report dated Mar. 9, 2009.

* cited by examiner

*Primary Examiner* — Richard Chang
(74) *Attorney, Agent, or Firm* — Kratz, Quintos & Hanson, LLP

(57) ABSTRACT

A method of manufacturing a catalytic converter includes the steps of: a detecting step for detecting a pressing force at a time when a catalyst (11) is press-fitted into an outer cylindrical housing (13); a calculating step for calculating a diameter reduction, by which a clearance value between the outer cylindrical housing (13) and the catalyst (11) is set to a desired target value, based on the pressing force detected by the detecting step; and a swaging step for reducing a diameter of the outer cylindrical housing (13) based on the diameter reduction calculated by the calculating step.

18 Claims, 12 Drawing Sheets

FIG.6
(a)
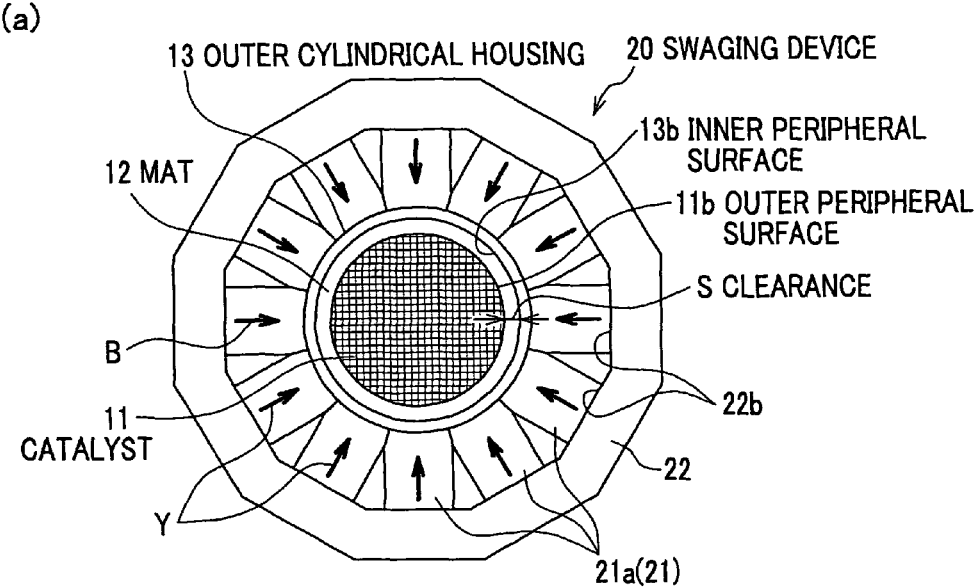
(b)
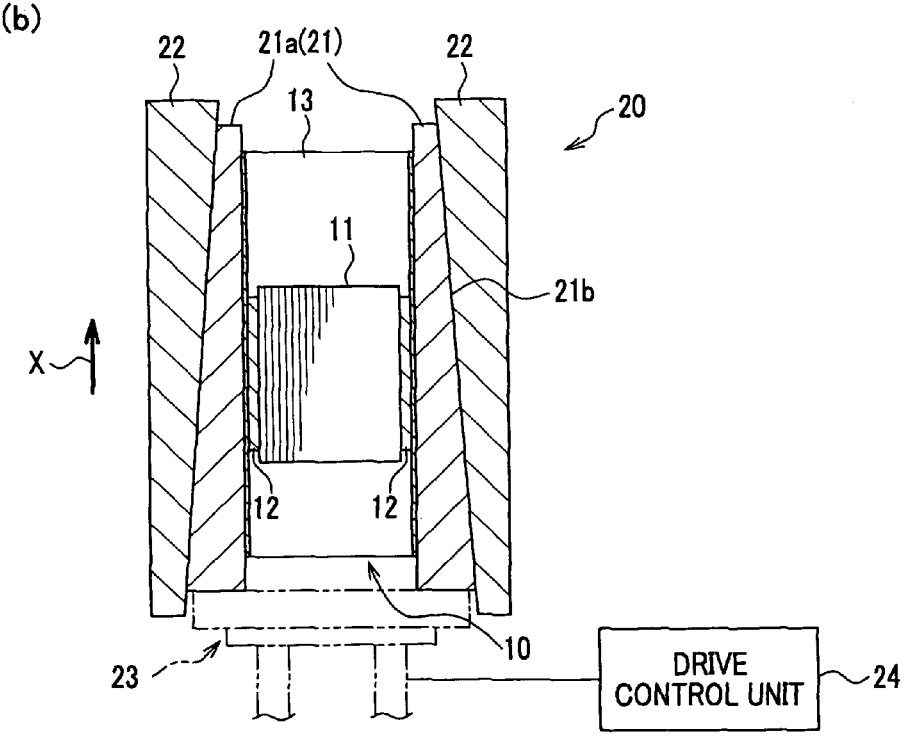

RELATION BETWEEN TARGET OUTER DIAMETER AND PRESSING FORCE

METHOD OF MANUFACTURING CATALYTIC CONVERTERS

TECHNICAL FIELD

The present invention relates to methods of manufacturing catalytic converters, catalytic converters, and methods of controlling catalytic converters, wherein each catalytic converter contains a catalyst wrapped with a cushion mat and supported in an outer cylindrical housing.

BACKGROUND OF THE INVENTION

Conventionally, exhaust systems of various engine types including automobile engines have been provided with a catalytic converter for cleaning exhaust gases. In general, a catalytic converter basically includes a columnar catalyst, a mat to be wrapped around the catalyst, and an outer cylindrical housing for accommodating the catalyst around which the mat has been wrapped, and by reducing the diameter (swaging) of the outer cylindrical housing the mat is pressed so that the catalyst is supported in the outer cylindrical housing.

The mat to be wrapped around the catalyst is made of heat resisting fibrous material and interposed between the catalyst and the outer cylindrical housing, so that the mat provides various functions such as to elastically support the catalyst and to thermally insulate the catalyst from the outer cylindrical housing as well as functions to ensure the sealing performance for preventing uncleaned exhaust gases from passing through the space between the catalyst and the outer cylindrical housing. Especially, in terms of retaining the capacity of the catalytic converter over an extensive period of time, the mat plays a very important role.

In order for the mat to perform its capacity, it is desirable to provide mats having an identical surface pressure. In particular, in catalysts which improve the exhaust efficiency or the cleaning capacity, walls which form a catalyst are thin walls and thus it is necessary to provide the mats having an identical surface pressure for the purpose of preventing drawbacks such as breakage due to elevated heat or vibrations during the use.

However, since catalysts differ in outer diameter size among the respective products, if the outer cylindrical housings are processed to have the same diameter by the swaging process, it is impossible for the mats to have the identical surface pressure. For this reason, as a general production method for providing the identical surface pressure of the mats, the conventional method comprises measuring an outer diameter of a catalyst, determining a predetermined target amount for reducing the diameter based on the measured value, and swaging the outer cylindrical housing based on the thus determined diameter reduction amount.

As other known methods such as, for example, disclosed by Japanese Laid-open Patent Application No. 2003-343255 (paragraphs 0019-0023; FIGS. 2 and 3), the surface pressure of the mat which has been wrapped around the catalyst is detected by a sensor, and thereafter, measuring the distance between the center of axis of the catalyst and the sensor when the surface pressure takes a predetermined value, and adjusting the diameter reduction at the subsequent swaging process such that the distance from the center of axis of the catalyst to the outer cylindrical housing is equal to this measured distance.

SUMMARY OF THE INVENTION

Problems to be Solved by the Invention

As described above, since the general production method for providing an identical surface pressure of mats requires to adjust the diameter reduction based on the measured value of the outer diameter of the catalyst, dispersion of the mats to be wrapped around the catalyst, for instance, in weight per area (BW) or density is not taken into consideration. Therefore, there is a problem that upon undergoing the dispersion of the mats, it is impossible to provide the identical surface pressure of the mats.

In this point, according to the conventional production method wherein the diameter reduction is adjusted after detecting the surface pressure of the mat, since the distance between the center of axis of the catalyst and the sensor is detected when the surface pressure of the mat takes the predetermined value and based on this the swaging process is carried out, it is possible to perform the swaging process while reflecting the property of the mat. However, in this production method, it is necessary to carry out the measuring operation for measuring the distance between the center of axis of the catalyst and the sensor apart from a series of press-fitting process. This is time-consuming and less productive.

Further, in this method, the distance from the catalyst to the sensor when the surface pressure becomes the predetermined value is regarded as the distance when the catalyst is properly installed in the outer cylindrical housing, and thus there is a problem that it is difficult to realize a stable support of the catalyst.

In addition, not only do catalysts have dispersion in size of the outer diameter as described above, but also the catalysts may have distortion, bend or the like. Further, since mats also have dispersion in the density distribution, it is in the first instance difficult by the partial measurement to measure the distance from the center of axis of the catalyst to the outer cylindrical housing in a single uniform way.

In view of the above, the object of the present invention is to provide a method of manufacturing a catalytic converter, a catalytic converter, and a method of controlling catalytic converters, which can provide an identical surface pressure of mats, and which can stably support the catalyst, and further which can improve the productivity.

Means for Solving the Problems

The inventors have diligently researched the above problems, and taking into account the relation between pressing force of the catalyst, which has been wrapped with the mat, upon press-fitting the catalyst into the outer cylindrical housing and the diameter reduction in the swaging process, have found that the above problems can be overcome by manufacturing a catalytic converter in such a manner that the diameter reduction in the swaging process is adjusted based on the pressing force at the press-fitting, and finally completed the invention.

To be more precise, according to one aspect of the present invention, there is provided a method of manufacturing a catalytic converter having a catalyst whose outer peripheral surface is wrapped with a mat, and an outer cylindrical housing which is swaged to support therein the catalyst. The method comprises: a detecting step for detecting a pressing force at a time when a pressing device presses the catalyst; a calculating step for calculating a diameter reduction of the outer cylindrical housing, by which a clearance value between the outer cylindrical housing and the catalyst is set to a desired target value, based on the pressing force detected by the detecting step; and a swaging step for reducing a diameter of the outer cylindrical housing based on the diameter reduction calculated by the calculating step.

The wording "detecting a pressing force" means to detect a force that is received by the outer cylindrical housing as well as to detect the counterforce of a pressing force. More specifically, the wording includes to detect the counterforce of the pressing force using a load cell, etc., and to detect a force upon pressing the catalyst at a receiving side, for example, when the outer cylindrical housing or a guide member for guiding press-fitting is expanded after receiving a pressing force or when the outer cylindrical housing or the guide member receives a load.

In the aforementioned manufacturing method, the outer cylindrical housing may be swaged after the catalyst is press-fitted into the outer cylindrical housing.

Alternatively, in the aforementioned manufacturing method, the catalyst may be press-fitted into the outer cylindrical housing after the outer cylindrical housing is swaged.

According to these manufacturing methods, when the pressing device presses the catalyst, the pressing force is detected in the detecting step, and in the calculating step, the diameter reduction of the outer cylindrical housing, by which the clearance value between the outer cylindrical housing and the catalyst is set to a desired target value, is calculated based on the detected pressing force. Therefore, based on the pressing force, the diameter reduction is calculated.

Herein, catalysts have dispersion in size of the outer diameter and mats also have dispersion in weight per area (BW) or density for individual products. For this reason, due to such dispersion, pressing force upon pressing the catalyst also takes a different value. Therefore, by calculating the diameter reduction based on this pressing force, it is possible to perform the swaging process on which the outer diameter size of the catalyst and the property of the mat are reflected. In other words, the pressing force by the pressing device gives a value on which dispersion of catalysts and mats is reflected, and by calculating the diameter reduction based on this value in a single uniform way an appropriate clearance can be formed. To be more specific, the greater the mass or density of a mat, the greater the pressing force becomes. On the contrary, the smaller the outer diameter size of the catalyst or the weight per area (BW) or density of the mat, the smaller the pressing force becomes.

Since calculation of the diameter reduction is carried out in parallel with or in series of the press-fitting operation of the catalyst, when compared with the conventional method, it is possible to eliminate time-consuming work such as separating and carrying out the measuring operation from a series of operations for the manufacturing process.

The outer cylindrical housing is then swaged in the swaging step based on the diameter reduction thus calculated in the calculating step. Accordingly, the diameter of the outer cylindrical housing is reduced for the predetermined amount so that the mat which has been wrapped around the catalyst is compressed, and then the clearance between the catalyst and the outer cylindrical housing is set to the desired target value. As a result, the catalytic converter having the mat whose surface pressure is identical can be obtained.

Herein, the wording "desired target value" indicates the size of the clearance between the outer cylindrical housing and the catalyst by which the mat packing density presents the surface pressure necessary for supporting the catalyst in a state such that the catalyst stably provides the maximum performance over extended period of time.

As described above, since the diameter reduction can be obtained in a single uniform way on the basis of the pressing force, a time-consuming measuring operation such as required by the conventional method becomes unnecessary, leading to decreased number of processes. Therefore, time required for the manufacturing process can be decreased, and the productivity can be improved more efficiently than ever while decreasing the cost.

Further, the diameter reduction can be obtained in consideration of dispersion to be presented for individual catalysts and mats, and therefore the clearance can be set appropriately regardless of the dispersion for products.

Therefore, it is possible to proactively evade drawbacks, for instance, that the catalyst rattles within the outer cylindrical housing, and that the catalyst is tightly pressed by the surface pressure of the mat, both derived from an improper setting of the clearance. As a result, the catalytic converter which provides durability for a long-term use and excellent product performance can be obtained.

Further, even in a catalyst whose catalyst walls are formed thinner because of recent developments on high output or improved purifying capacity, because the swaging process is carried out after the diameter reduction is obtained from the detected pressing force, the catalyst can be supported in the outer cylindrical housing with a proper surface pressure, thereby preventing a breakage.

In the aforementioned manufacturing method, the press-fitting of the catalyst may be carried out using a funnel-shaped enlarged diameter member, and the detection of the pressing force by the detecting step may be carried out by detecting a pressing force upon press-fitting the catalyst into the enlarged diameter member.

According to this manufacturing method, the press-fitting is carried out using a funnel-shaped enlarged diameter member, and so the press-fitting of the catalyst into the outer cylindrical housing is smoothly performed. If the funnel-shaped enlarged diameter member is a separate member, the detection of the pressing force by the detecting step is carried out by detecting a pressing force upon press-fitting the catalyst into the funnel-shaped enlarged diameter member and thus is hardly subject to dispersion of the outer cylindrical housings. The pressing force on which dispersion of the catalysts and the mats is relatively accurately reflected can be obtained. Therefore, it is possible to obtain a highly accurate diameter reduction.

The funnel-shaped enlarged diameter member may be integral with the outer cylindrical housing, and the press-fitting of the catalyst may be carried out using such an enlarged diameter member. In this instance, such an operation to use a separate enlarged diameter member and to attach the same to the outer cylindrical housing becomes unnecessary, which simplifies the operation upon press-fitting.

Moreover, the enlarged diameter member may comprise an inclined portion, and a cylindrical portion having a straight inner surface which continuously extends from the inclined portion, and the detection of the pressing force by the detecting step may be carried out at a position just before a rear end portion of the mat enters from the inclined portion into the cylindrical portion as viewed in a press-fitting direction of the catalyst.

According to this manufacturing method, the pressing force is detected in such a position that the pressing force takes a proper peak value at a time when the catalyst is guided by the funnel-shaped enlarged diameter member and is press-fitted. Therefore, by calculating the diameter reduction based on this pressing force, the swaging process can be carried out such that the clearance is set to the desired target value.

Herein, in the process of press-fitting the catalyst using the funnel-shaped enlarged diameter member, the peak value of the pressing force almost always presents at a time when the catalyst passes at substantially the same position. Therefore, specifying this position and detecting the pressing force makes it possible to detect the pressing force in a proper manner. This can also lead to reduction of the cost.

Further, the cylindrical portion may be formed to have a length such that at least an entire length of the catalyst is received therein, and the detection of the pressing force by the detecting step may be carried out at a position just before the rear end of the mat enters from the inclined portion into the cylindrical portion as viewed in the press-fitting direction of the catalyst.

According to this manufacturing method, when the pressing force is detected, the catalyst is retained in the cylindrical portion of the funnel-shaped enlarged diameter member, thereby preventing the catalyst from entering into the outer cylindrical housing. In other words, the detection of the pressing force is carried out within the cylindrical portion of the enlarged diameter member. Therefore, the pressing force can be obtained, which is hardly subject to dispersion in shape of the outer cylindrical housings and surface roughness, and on which dispersion of the catalysts and the mats is relatively accurately reflected. Therefore, it is possible to obtain a highly accurate diameter reduction value.

Further, the detection of the pressing force by the detecting step may be carried out by detecting a pressing force of the catalyst after the catalyst is press-fitted into the outer cylindrical housing.

According to this manufacturing method, since the detection of the pressing force is carried out for the catalyst which has been press-fitted into the outer cylindrical housing, the pressing force can be detected in such a state that the property of the outer cylindrical housing, into which the catalyst has actually been accommodated, is reflected. Therefore, it is possible to obtain the diameter reduction, which is close to the value in the actual mounting state. Further, since there is no need to detect the pressing force in the funnel-shaped enlarged diameter member, a smooth press-fitting operation is achieved, which leads to reduction of time required for the press-fitting operation.

Moreover, the aforementioned manufacturing method may further comprise a pre-swaging step for providing a reduced diameter portion on the outer cylindrical housing by a swaging process, in which swaging is performed with a smaller diameter reduction than the diameter reduction in the swaging step, and for providing an inclined stepped portion between this reduced diameter portion and a non-swaged portion, and the detection of the pressing force by the detecting step may be carried out at a position just before a rear end portion of the mat enters from the stepped portion into the reduced diameter portion as viewed in a press-fitting direction of the catalyst.

According to this manufacturing method, since the pre-swaging step provides a fixing part of the outer cylindrical housing, at which the catalyst is supported, in advance of press-fitting the catalyst with a small diameter reduction than the diameter reduction in the swaging step, it is possible to decrease time required for the swaging process after the press-fitting of the catalyst. Further, the catalyst is press-fitted into the outer cylindrical housing, which is similar to the state where the swaging process is applied, and therefore it is possible to detect the pressing force while supposing the actual mounting state.

Furthermore, the detection of the pressing force by the detecting step is carried out at a position just before the rear end portion of the mat enters from the stepped portion formed in the pre-swaging step into the reduced diameter portion, and therefore the detection of the pressing force can be carried out at a position where the pressing force takes a proper peak value. This can also lead to reduction of the cost.

The aforementioned manufacturing method may further comprise a press-fitting step for temporarily stopping a press-fitting operation after the catalyst is entirely press-fitted inside the outer cylindrical housing, and a re-press-fitting step for restarting the press-fitting operation temporarily stopped by the press-fitting step and re-press-fitting the catalyst, and the detection of the pressing force by the detecting step may be carried out at the re-press-fitting step.

According to this manufacturing method, the press-fitting operation of the catalyst is temporarily stopped by the press-fitting step, and thereafter this temporarily stopped press-fitting operation is restarted by the re-press-fitting step and at this time the detection of the pressing force is carried out. This enables the pressing force to be detected in a state where the property of the outer cylindrical housing is reflected. Therefore, it is possible to obtain the diameter reduction, which is close to the value in the actual mounting state.

Further, since the detection of the pressing force by the detecting step is carried out at the re-press-fitting step, there is no need to detect the pressing force until the re-press-fitting step. This makes it possible to provide a manufacturing method with excellent detection efficiency. This can also lead to reduction of the cost.

In the aforementioned manufacturing method, the calculation of the diameter reduction by the calculating step may be carried out based on data which are previously set in accordance with kinds of mats, catalysts, and outer cylindrical housings.

According to this manufacturing method, since the calculation of the diameter reduction by the calculating step is carried out based on data which are previously set in accordance with kinds of mats, catalysts, and outer cylindrical housings, it is possible to calculate the diameter reduction on which properties of kinds of the mat, the catalyst, and the outer cylindrical housing are reflected and to approximate the clearance more closer to the desired target value. By utilizing this manufacturing method, the catalytic converter which provides excellent product performance can be obtained.

In the aforementioned manufacturing method, the calculation of the diameter reduction by the calculating step may be carried out based on a peak value of the pressing force detected by the detecting step at a predetermined insertion position. Herein, the peak value indicates one peak value having the maximum value or one peak value obtained under a predetermined setting condition.

According to this manufacturing method, since the calculation of the diameter reduction by the calculating step is carried out based on the peak value of the pressing force detected by the detecting step at a predetermined insertion position, it is possible to prevent the catalyst from being tightly supported in the outer cylindrical housing with an improper surface pressure, thereby preventing a breakage.

In the aforementioned manufacturing method, a sheet made of polypropylene or polyethylene terephthalate may be attached to an outer surface of the mat.

According to this manufacturing method, since the outer surface of the mat is covered by the sheet, it is possible to prevent an occurrence of dispersion in friction coefficient upon detecting the pressing force due to adhesion of the binder contained in the mat. Further, since the mat to which the sheet is attached is hardly affected by moisture, the detection of the pressing force can be performed in a more stable manner.

According to another aspect of the present invention, there is provided a catalytic converter which supports a catalyst, whose outer peripheral surface is wrapped with a mat, inside an outer cylindrical housing, the diameter of which is reduced to support the catalyst. The catalytic converter is manufactured by: detecting a pressing force at a time when a pressing device presses the catalyst; determining a diameter reduction of the outer cylindrical housing, by which a clearance value between the outer cylindrical housing and the catalyst is set to a desired target value, based on the pressing force thus detected; and reducing the diameter of the outer cylindrical housing based on the diameter reduction thus determined.

This catalytic converter is manufactured by detecting a pressing force of the pressing device, determining the diameter reduction of the outer cylindrical housing, by which a clearance value between the outer cylindrical housing and the catalyst is set to a desired target value, based on the pressing force thus detected, and by reducing the diameter of the outer cylindrical housing based on the diameter reduction thus determined, and so it is possible to obtain a catalytic converter, which is swaged using the diameter reduction reflecting the outer diameter size of the catalyst and the property of the mat.

Therefore, the clearance between the outer cylindrical housing and the catalyst can be set to an optimum clearance (desired target value) in conformity with the size of the catalyst and the property of the mat, and the surface pressure of the mat becomes identical. As a result, the catalytic converter which provides durability for a long-term use and excellent product performance can be obtained.

According to still another aspect of the present invention, there is provided a method of controlling catalytic converters for checking on acceptance/rejection of each catalytic converter, which supports a catalyst, whose outer peripheral surface is wrapped with a mat, inside an outer cylindrical housing, the diameter of which is reduced to support the catalyst. The method comprises the steps of: a detecting step for detecting a pressing force at a time when a pressing device press-fits the catalyst; a calculating step for calculating a diameter reduction of the outer cylindrical housing, by which a clearance value between the outer cylindrical housing and the catalyst is set to a desired target value, based on the pressing force detected by the detecting step; a swaging step for reducing a diameter of the outer cylindrical housing based on the diameter reduction calculated by the calculating step; and a determination step for the pressing device pressing the catalyst in the swaged outer cylindrical housing to determine whether or not the catalyst is supported by a predetermined packing density.

According to this controlling method, based on the diameter reduction calculated through the detecting step and the calculating step, a check can be made as to whether the catalyst supported in the swaged outer cylindrical housing is in a predetermined mat packing density range or whether the catalyst satisfies a standard as a critical value for the mat packing density for the purpose of controlling products.

Since there is a correlation between the pressing force of the pressing device upon pressing the catalyst and the mat packing density at this point of time, it is possible to calculate the diameter reduction for supporting the catalyst with a predetermined mat packing density on the basis of the mat packing density calculated from the pressing force of the pressing device.

Namely, paying attention to the correlation between the pressing force of the pressing device and the mat packing density, and by estimating (calculating) the mat packing density after swaging, a control can be made based on this calculated value.

In the aforementioned controlling method, the determination step may be carried out after the catalyst is press-fitted into the outer cylindrical housing.

Alternatively, in the aforementioned controlling method, the determination step may be carried out after the outer cylindrical housing is swaged and in the process of press-fitting the catalyst into the outer cylindrical housing.

Further, in the aforementioned controlling method, a sheet made of polypropylene or polyethylene terephthalate may be attached to an outer surface of the mat.

According to these controlling methods, since the outer surface of the mat is covered by the sheet, it is possible to prevent an occurrence of dispersion in friction coefficient upon detecting the pressing force because of adhesion of the binder contained in the mat. Further, since the mat to which the sheet is attached is hardly affected by moisture, the detection of the pressing force can be performed in a more stable manner. The determination as to whether or not the catalyst is supported by the predetermined mat packing density can also be made in a more stable manner without dispersion in friction coefficient.

Other aspects, effects, and additional features of the present invention will become more apparent by describing in detail illustrative, non-limiting embodiments thereof with reference to the accompanying drawings.

BRIEF DESCRIPTION OF THE DRAWINGS

FIG. 6 explains a swaging process during the manufacture of the catalytic converter, in which FIG. 6(a) is a schematic view of the catalytic converter in the swaging process as viewed from side, and FIG. 6(b) is a conceptual sectional view showing around the catalytic converter.

BEST MODE FOR CARRYING OUT THE INVENTION

With reference to the accompanying drawings, a method of manufacturing a catalytic converter and a catalytic converter according to one embodiment of the present invention will be described below.

Figure 1:
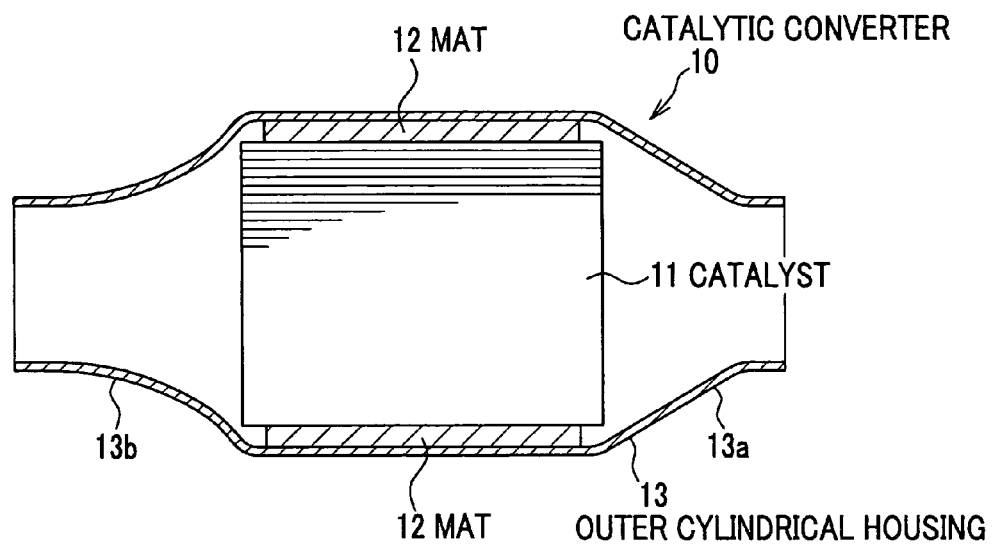
FIG. 1 is a sectional view of a catalytic converter manufactured by a method of manufacturing a catalytic converter according to one embodiment of the present invention.
Figure 2:
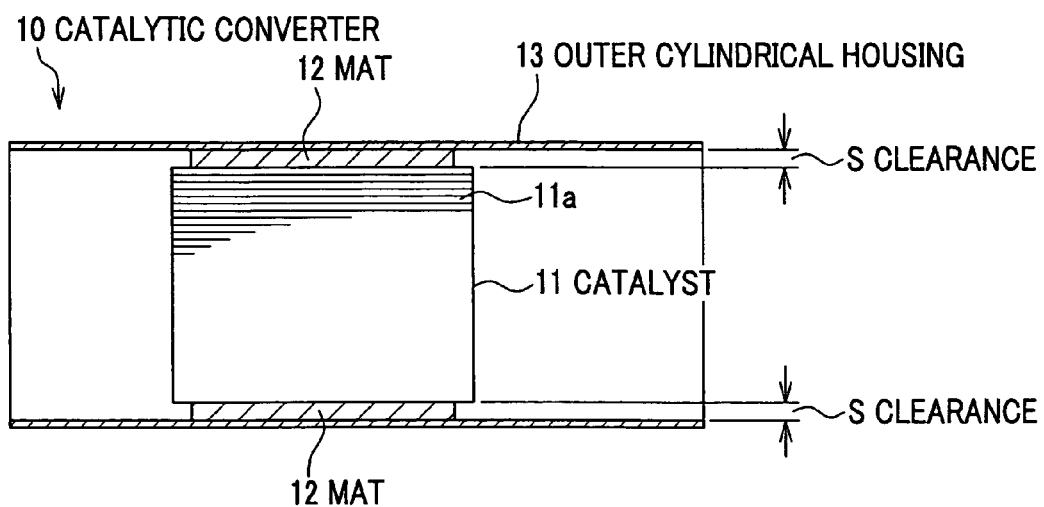
FIG. 2 is a sectional view similar to FIG. 1 but showing the catalytic converter before applying a spinning process.

As shown in FIGS. 1 and 2, a catalytic converter 10 according to this embodiment includes a catalyst carrier (herein after refereed to as a catalyst) 11 which is cylindrical in shape and having high cell density, a mat 12 which is wrapped around the catalyst 11, and an outer cylindrical housing 13 which accommodates the catalyst having been wrapped with the mat 12. The catalyst 11 is supported in the outer cylindrical housing 13 with a predetermined clearance S that is formed by the thickness of the mat 12.

The catalyst 11 is a cordierite monolith carrying an exhaust gas cleaning catalyst such as platinum and substantially in the shape of a cylinder, and as shown in FIG. 2, a plurality of honeycomb-shaped passageways 11a are formed inside and extend in the axial direction of the catalyst 11. Exhaust gases pass through the honeycomb-shaped passageways 11a during which exhaust gas components contained in the exhaust gases are cleaned by porous cellular walls forming the honeycomb-shaped passageways 11a.

The mat 12 comprises silica-alumina ceramic fiber, unexpanded vermiculite, binder, and inorganic fiber, the mixture thereof, or the combination thereof, and is formed in a sheet. The mat 12 functions to support or retain the catalyst 11 in the outer cylindrical housing 13 and also to prevent a leakage of the exhaust gases from a space between the catalyst 11 and the outer cylindrical housing 13. By means of a swaging process to be described later, the mat 12 holds the catalyst 11 with a constant surface pressure. According to this embodiment, because of the swaging process to be described later, a sufficient supporting force can be expected for the outer cylindrical housing 13 to support therein the catalyst 11. The mat 12 may be formed without using binder or in the shape of a cylinder.

The outer cylindrical housing 13 is made of a steel material such as stainless steel, and has a cylindrical shape with a more or less perfect circular cross-section while being elongated to accommodate therein the catalyst 11 having been wrapped with the mat 12.

In this embodiment, as shown in FIG. 1, cone-shaped exhaust passages 13a, 13b are formed in openings positioned at both ends of the outer cylindrical housing 13 after the swaging process is carried out.

To be described later, the catalyst 11 around which the mat 12 has been wrapped is inserted by press-fitting into the outer cylindrical housing 13.

Figure 3:
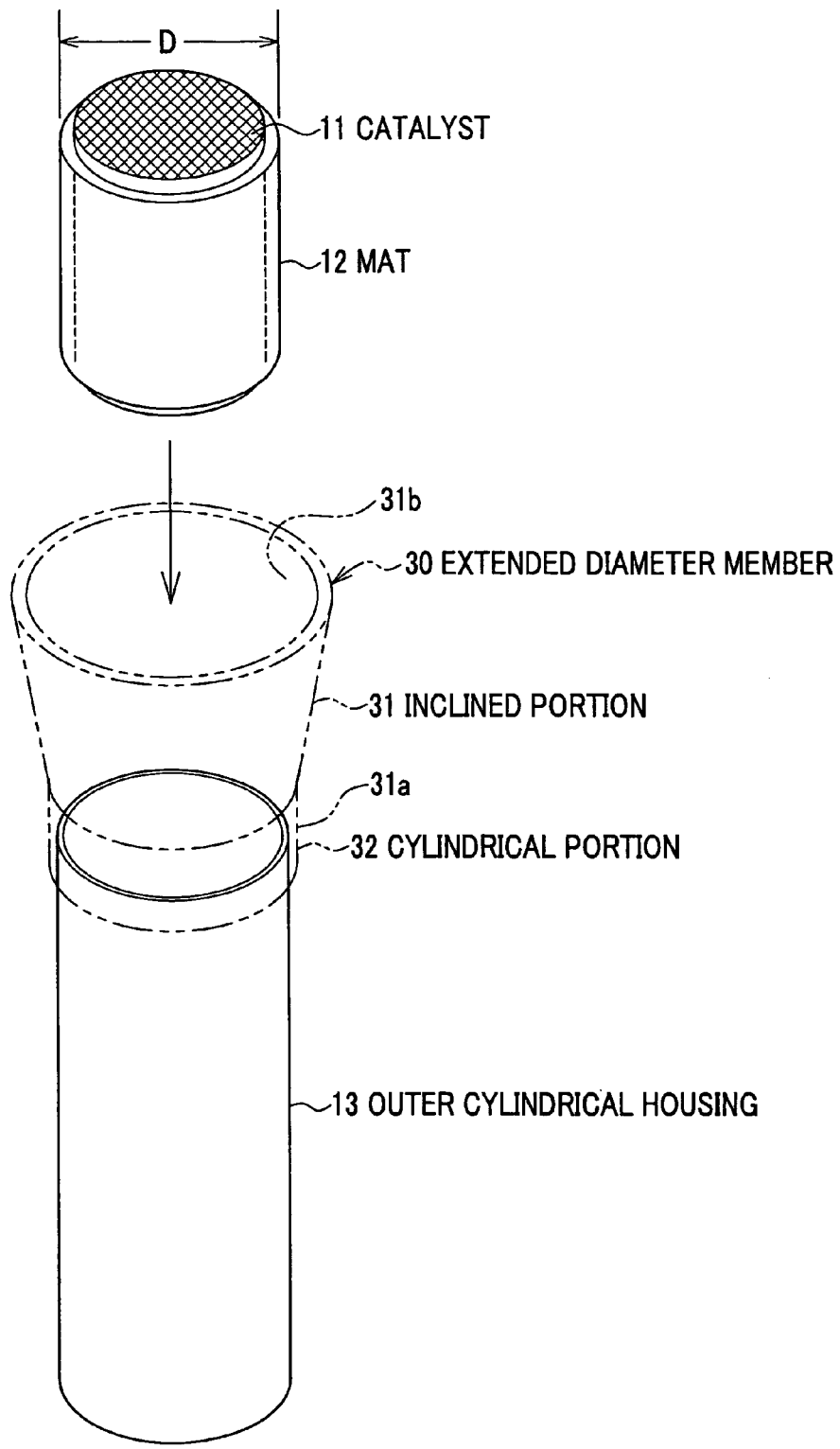
FIG. 3 is a perspective view explaining a press-fitting process for press-fitting a catalyst during the manufacture of the catalytic converter.

As shown in FIG. 3, upon press-fitting the catalyst 11 an enlarged diameter member 30 as a funnel-shaped enlarged diameter member is used. The enlarged diameter member 30 is a cylindrical guide jig used for press-fitting the catalyst 11, whose outer peripheral surface is wrapped with the mat 12, into the outer cylindrical housing 13. The enlarged diameter member 30 includes an inclined portion 31 at least having a funnel-shaped inner surface 31b, and a cylindrical portion 32 having a straight inner surface 32a (see FIG. 4(a)) which continuously extends from the lower part 31a of the inclined portion 31.

As shown in FIG. 4(a), the inclined portion 31 inclines at a constant angle θ and its inclined surface 31a is formed to continuously extend from the inner surface 32a of the cylindrical portion 32 positioned below without any unevenness. The inner diameter D1 at the upper end portion of the inclined portion 31 is larger than the outer diameter D of the catalyst 11 (including the mat 12 (see FIG. 3)) so that insertion of the catalyst 11 upon press-fitting is smoothly performed.

Provided circumferentially at the lower inner periphery of the cylindrical portion 32 is a stepped portion 32b, into which the upper portion 13c of the outer cylindrical housing 13 is fitted. The inner diameter of the cylindrical portion 32 is slightly smaller than the inner diameter of the outer cylindrical housing 13. Therefore, as shown in FIGS. 4(a) and 4(b), when the enlarged diameter member 30 is attached to the upper portion 13c of the outer cylindrical housing 13, the inner surface 32a of the cylindrical portion 32 slightly protrudes inward. In order to prevent a play between the inner periphery of the stepped portion 32b and the outer cylindrical housing 13, a minimum fit-in tolerance is set while allowing the fit-in operation therebetween.

To achieve a smooth press-fitting, the inclined surface 31a and the inner surface 32a of the enlarged diameter member 30 are smoothed.

Using such an enlarged diameter member 30 makes is possible to smoothly press-fit the catalyst having been wrapped with the mat 12 from the inclined portion 31 and through the cylindrical portion 32 of the enlarged diameter member 30 into the outer cylindrical housing 13. In other words, the catalyst 11 around which the mat 12 has been wrapped is inserted while the mat 12 is gradually compressed by the inclined portion 31 of the enlarged diameter member 30, and then the catalyst 11 is further compressed at the cylindrical portion 32 and inserted into the outer cylindrical housing 13.

Press-fitting of the catalyst 11 using this enlarged diameter member 30 is carried out by the following procedure. In this instance, a press-fitting device (not shown) is employed for the press-fitting operation. At first, as shown in FIG. 5(a), the enlarged diameter member 30 is fitted onto the upper portion 13c of the outer cylindrical housing 13, and the catalyst 11 having been wrapped with the mat 12 is inserted, for example by a manual operation, from the opening at the inclined portion 31 of the enlarged diameter member 30 into the enlarged diameter member 30. A pressing member A of the press-fit device (not shown) is then lowered toward the catalyst 11 that has been inserted into the enlarged diameter member 30, so that the bottom surface of the pressing member A closely contacts with the upper surface of the catalyst 11. And as shown in FIG. 5(b), the pressing member A is further lowered. By this operation, the catalyst 11 is further pressed and moved lower, and then the catalyst 11 is press-fitted inside the outer cylindrical housing 13. Thereafter, as shown in FIG. 5(d), the enlarged diameter member 30 is detached from the upper portion 13c of the outer cylindrical housing 13 to complete the press-fitting operation.

According to this embodiment, the pressing force upon press-fitting the catalyst 11 by the pressing member A can be detected during this press-fitting operation. Detected data of the pressing force is utilized as the data required for calculating the diameter reduction for the outer cylindrical housing 13 in the swaging process to be described later.

As shown in FIG. 5(b), provided above the pressing member A is a load cell B for detecting the pressing force of the pressing member A. The pressing force of the pressing member A can be detected using the load cell B. To be more specific, since the abutment area of the pressing member A is already known, the counterforce to be generated when the pressing member A presses the catalyst 11 having been wrapped with the mat 12 can be detected by the load cell B as a surface pressure relative to the catalyst 11.

Detection signals indicating the pressing force detected by the load cell B are input into a controller C, such as a computer that is installed integrally with or separately from the press-fit device. The detection signals from the load cell B are stored in a built-in memory of the controller C. According to this embodiment, the maximum peak value of the detection signals is stored in the memory. However, surface pressure values stored in the memory is not limited to the maximum peak value, and it is possible to detect a predetermined condition, for instance, a stroke distance of the pressing member A during the press-fitting process and to detect the peak value at the specific stroke area (peak value at a predetermined insertion position).

The controller C includes a calculation unit (calculation step) C1 for calculating the diameter reduction, by which the clearance value between the outer cylindrical housing 13 and the catalyst 11 is set to a desired target value, based on this detected pressing force. The calculation unit C1 stores a data table in advance which prescribes diameter reduction amounts (specifically, ram stroke driving rates of a swaging die 21 of a slider 23 to be described later) in relation to detected values (surface pressure values) of the pressing force, so that when one surface pressure value stored in the memory is input, the diameter reduction on the basis of this surface pressure value can be calculated. The data table stores data in accordance with kinds (products) of catalysts 11 and mats 12.

Further, a rotary encoder (not shown) detects the advancing/retracting rate of the pressing member A and the stopping position of the pressing member A as rotation information of a ball screw (not shown), and this detected information is also input into the controller C. At the controller C, the detection signals from the rotary encoder are converted into the advancing/retracting rate of the pressing member A or the value for the stopping position of the pressing member A and then stored in the memory (not shown). The advancing/retracting rate of the pressing member A or the value for the stopping position of the pressing member A is stored in the memory in association with the surface pressure value as described above. Namely, it is possible to specify the position of the pressing member A at a time when the peak value of the surface pressure values is detected. This can be used when calculating the diameter reduction to be described later.

FIG. 6 explains the swaging process to be executed after the press-fitting process, in which FIG. 6(a) is a schematic view of the catalytic converter in the swaging process as viewed from side, and FIG. 6(b) is a conceptual sectional view showing the catalytic converter. In this embodiment, explanation will be given to the process for reducing the diameter of the outer cylindrical housing 13 by swaging. Adjustment of the diameter reduction according to the swaging device 20 is made based on the detection result of the pressing force (counterforce) that has been detected at the press-fitting process.

Explanation will be given below for the respective parts. As shown in FIG. 6(a), the swaging device 20 at least comprises a swaging die 21 having a plurality of fingers 21a, a swaging collar 22 having inner wall surfaces 22b to which each of the fingers 21a of the swaging die 21 slidably contacts, and a slider 23 for stroking the swaging die 21 using the ram.

The swaging die 21 is formed such that the slide contact surface 21b of each finger 21a relative to the swaging collar 22 inclines to be narrower in the ram stroke direction of the swaging die 21 (i.e., direction of arrow X as shown in FIG. 6(b): insertion direction). The swaging collar 22 is shaped to conform with the slide contact surfaces 21b of the swaging die 21. Therefore, when the swaging die 21 is inserted into the swaging collar 22, it is moved in the swaging direction (i.e., direction of arrow Y as shown in FIG. 6(a)) while being pressed by the collar 22. According to this embodiment, the swaging die 21 having the total of twelve fingers 21a is employed which can surround the entire periphery of the outer cylindrical housing 13. Taking into consideration the size of the outer cylindrical housing 13 or the like, the number of fingers 21a can be adjusted where necessary.

The swaging die 21 is constructed to be slidable in the ram stroke direction and the counter ram stroke direction by means of the slider 23.

Drive control of the slider 23 is performed by a drive control unit 24 (swaging step), and the drive control of the slider 23 by the drive control unit 24 is carried out based on the detection result of the pressing force (counterforce) detected at the press-fitting process. Namely, by inputting the data indicating the diameter reduction that is obtained by the controller C during the press-fitting process, the drive of the slider 23 is controlled using the drive control rate associated with the diameter reduction.

Taking into consideration the spring back effect of the outer cylindrical housing 13 while evading a risk about breakage of the catalyst 11 or crush of the mat 12, the drive control rate of the slider 23 may be set, for instance by a manual input, by adding such a value to the data on the diameter reduction from the controller C (see FIG. 5(b)).

When the drive control of the slider 23 on the ram stroke is carried out by the drive control unit 24, the swaging die 21 is driven to move in the swaging direction. As a result, the catalytic converter 10 is processed to a state having been swaged with a desired diameter reduction.

The drive control unit 24 also reversely drives the slider 23 in the counter ram stroke direction after the swaging process is completed, and sends a signal to the swaging device 20 so that the swaging device 20 releases the retaining state.

Next, explanation will be given to the method of manufacturing a catalytic converter 10 using such a swaging device 20. In advance of the swaging, a mat 12 is wrapped around the outer peripheral portion of the catalyst 11. Then, the end portions of the wrapped mat 12 are fixed by tape (not shown) or the like. It is not necessary to fix the end portions by tape. If the mat 12 is cylindrical in shape, such a fixing operation is unnecessary.

In this instance, both ends of the mat 12 may be provided in advance with a protruding portion (not shown) and a recess portion (not shown) which are engageable with each other, so that they are engaged after the mat 12 is wrapped around the catalyst 11. A metallic seal member or the like may be further wrapped on the mat 12 that has been wrapped around the catalyst 11 so as to reduce the thickness of the mat 12 or to improve the sealing performance.

Figure 4:
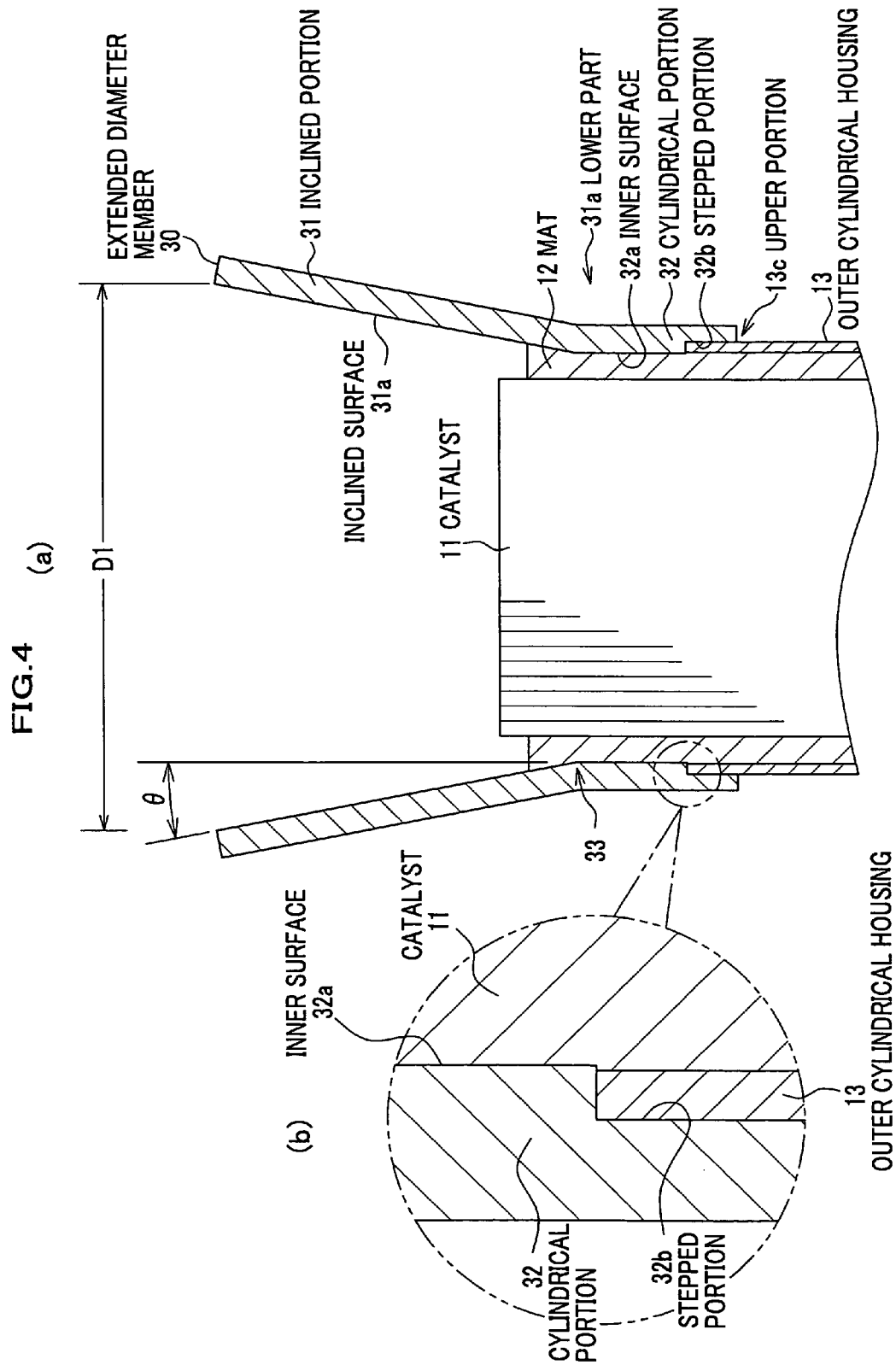
FIG. 4(a) is an end view schematically showing a state in which the catalyst is press-fitted using an enlarged diameter member.
FIG. 4(b) is a partly enlarged end view.

After that, the catalyst 11 around which the mat 12 has been wrapped is press-fitted and inserted into the outer cylindrical housing 13 by the press-fitting process. Upon insertion of the catalyst 11, the enlarged diameter member 30 as shown in FIGS. 3 and 4 is used. Therefore, the insertion of the catalyst 11 into the outer cylindrical housing 13 can be smoothly performed while preventing the mat 12 from being damaged upon insertion due to contact of the mat 12 against the fringe portion of the outer cylindrical housing 13 or the like.

When the catalyst 11 is press-fitted into the outer cylindrical housing 13, as shown in FIG. 5(b), the load cell B detects the pressing force of the pressing member A at the same time as the press-fitting operation. According to this embodiment, the peak value of the pressing force is stored in the memory by the controller C. As one peak value of the pressing force to be considered as effective for calculation of the diameter reduction, the inventors have found by experiments that as shown in FIG. 4(a), a desirable value can be detected at the position just before the rear end portion of the mat 12 having been wrapped around the catalyst 11 enters from the inclined portion 31 of the enlarged diameter member 30 into the cylindrical portion 32. This can be lead by the relation between peak values and positions of the pressing member A based on the data stored in the memory of the controller C, and therefore, it is possible to detect the pressing force only when the catalyst 11 passes near this area. In this instance, since there is no need to always detect the pressing force, a smooth press-fitting operation with the pressing member A can be realized and reduction of time required for the press-fitting process can be achieved.

To be more precise, the pressing force upon press-fitting tends to be stronger as the mass or density of the mat 12 becomes larger. On the contrary, the pressing force tends to be weaker as the outer diameter size of the catalyst 11, or the weight per area (BW) or the density of the mat 12 becomes smaller.

Figure 5:
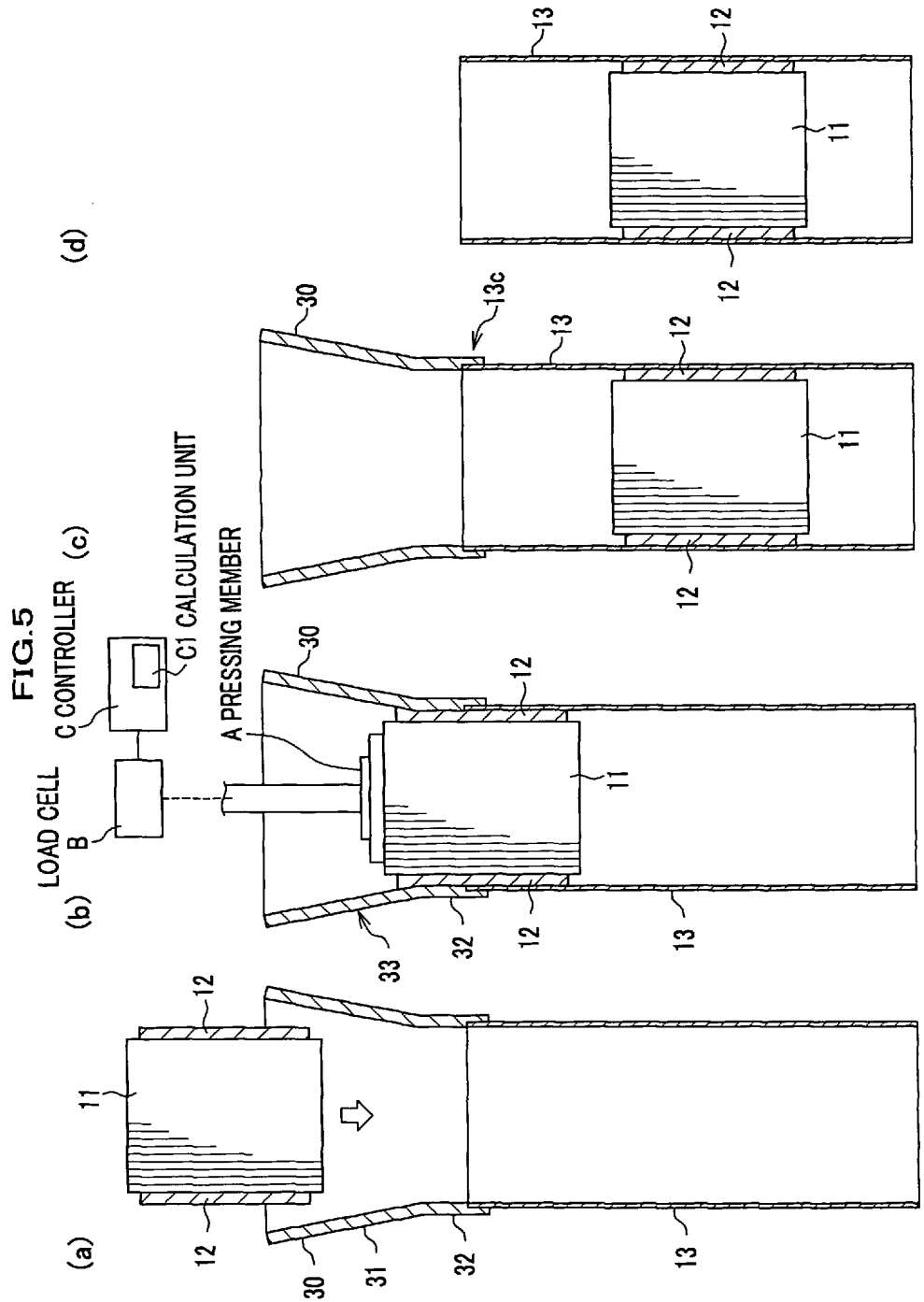
FIGS. 5(a) through 5(d) are schematic sectional views explaining the press-fitting operation.

As shown in FIG. 5(*d*), after insertion of the catalyst 11, the catalyst 11 and the mat 12 are positioned around the center of the outer cylindrical housing 13 in the axial direction of the outer cylindrical housing 13.

Thereafter, the diameter reduction is calculated based on the data of the detected pressing force (calculating step), and the data is input to the drive control unit 24 (see FIG. 6(*b*)). The drive control unit 24 then stands by for controlling driving of the slider 23 of the swaging device 20 based on this input data on the diameter reduction.

The outer cylindrical housing 13 into which the catalyst 11 and the mat 12 have been inserted is positioned at a predetermined position of the swaging device 20, and as shown in FIGS. 6(*a*) and 6(*b*), each of the fingers 21*a* of the swaging die 21 abuts on the outer peripheral wall of the outer cylindrical housing 13. The drive control unit 24 then controls driving of the slider 23 to move the ram and consequently the slider 23 for a predetermined amount of stroke. By this operation, the fingers 21*a* of the swaging die 21 are driven in the swaging direction for the predetermined distance, so that the swaging process is carried out to reduce the diameter for the predetermined amount by the swaging die 21 and the swaging collar 22.

Therefore, the mat 12 generates a surface pressure in accordance with the diameter reduction, and by the frictional force derived from the surface pressure the catalyst 11 is stably supported in the outer cylindrical housing 13. Subsequently, the slider 23 is retracted in the counter ram stroke direction to pull out the swaging die 21 from the swaging collar 22, and the catalytic converter 10 is removed from the swaging die 21. As described above, the swaging process is carried out using the diameter reduction calculated on the basis of the pressing force upon press-fitting the catalyst 11 into the outer cylindrical housing 13, and the catalytic converter 10 having a predetermined clearance S can be obtained.

Thereafter, as shown in FIG. 1, cone-shaped exhaust passages 13*a*, 13*b* are formed in the catalytic converter 10, for example, by applying a spinning process to the openings arranged at both ends of the outer cylindrical housing 13. The catalytic converter 10 is thereby manufactured.

According to the catalytic converter 10 as described above, based on the pressing force to be detected during the press-fitting, calculation is made on the diameter reduction, by which the clearance value between the outer cylindrical housing 13 and the catalyst 11 is set to a desired target value, and the swaging process is carried out based on this calculated diameter reduction.

Herein, catalysts 11 have dispersion in size of the outer diameter and mats 12 also have dispersion in weight per area (BW) or density for individual products. For this reason, due to such dispersion, the pressing force also takes a different value. Therefore, by calculating the diameter reduction based on this pressing force, it is possible to perform the swaging process on which the outer diameter size of the catalyst 11 and the property of the mat 12 are reflected. In other words, the pressing force upon press-fitting gives a value on which dispersion of catalysts 11 and mats 11 is reflected, and by calculating the diameter reduction based on this value in a single uniform way an appropriate clearance S can be formed.

Further, since calculation of the diameter reduction is carried out in parallel with the press-fitting operation of the catalyst 11, when compared with the conventional method, it is possible to eliminate time-consuming work such as separating and carrying out the measuring operation from a series of operations for the manufacturing process.

As described above, since the diameter reduction can be obtained in a single uniform way on the basis of the pressing force, a time-consuming measuring operation such as required by the conventional method becomes unnecessary, thereby leading to decreased number of processes. Therefore, time required for the manufacturing process can be decreased, and the productivity can be improved more efficiently than ever while decreasing the cost.

Further, the diameter reduction can be obtained in consideration of dispersion to be presented for individual catalysts 11 and mats 12, and therefore the clearance S (see FIG. 2) can be set appropriately regardless of the dispersion for products.

Therefore, it is possible to proactively evade drawbacks, for instance, that the catalyst 11 rattles within the outer cylindrical housing 13, and that the catalyst 11 is tightly pressed by the surface pressure of the mat 12, both derived from an improper setting of the clearance S. As a result, the catalytic converter 10 which provides durability for a long-term use and excellent product performance can be obtained.

Further, even in a catalyst 11 whose catalyst walls are formed thinner because of recent developments on high output or improved cleaning capacity, because the swaging process is carried out after the diameter reduction is obtained from the detected pressing force, the catalyst 11 can be supported in the outer cylindrical housing 13 with a proper surface pressure, thereby preventing a breakage.

Further, since the calculation of the diameter reduction is carried out based on data which are previously set in accordance with kinds of catalysts 11, mats 12, and outer cylindrical housings 13, it is possible to calculate the diameter reduction on which properties of these kinds are reflected and to approximate the clearance S more closer to the desired target value. Therefore, the catalytic converter 10 which provides excellent product performance can be obtained.

Since the calculation of the diameter reduction is carried out based on the peak value of the pressing force, it is possible to prevent the catalyst 11 from being tightly supported in the outer cylindrical housing 13 with an improper surface pressure, thereby preventing a breakage. Further, it is possible to specify a setting area for detecting the peak value so that the peak value is detected in this specified area and the diameter reduction is calculated based on this peak value. This can provide the manner of calculation for the diameter reduction, which is highly reliable with less noise.

It is also possible to detect the pressing force at a position in which the pressing force substantially takes the peak value when the catalyst 11 is press-fitted while being guided by the enlarged diameter member 30. This can simplify the detecting method for detecting the pressing force when compared with the system which, for instance, always detects the pressing force throughout the press-fitting operation. Therefore, reduction of the cost can be achieved.

It is not necessary that the swaging process is performed by the swaging device 20, and other various methods such as spinning process can be adopted.

The swaging process may be divided into a plurality of steps so that swaging proceeds gradually by each step.

Figure 7:
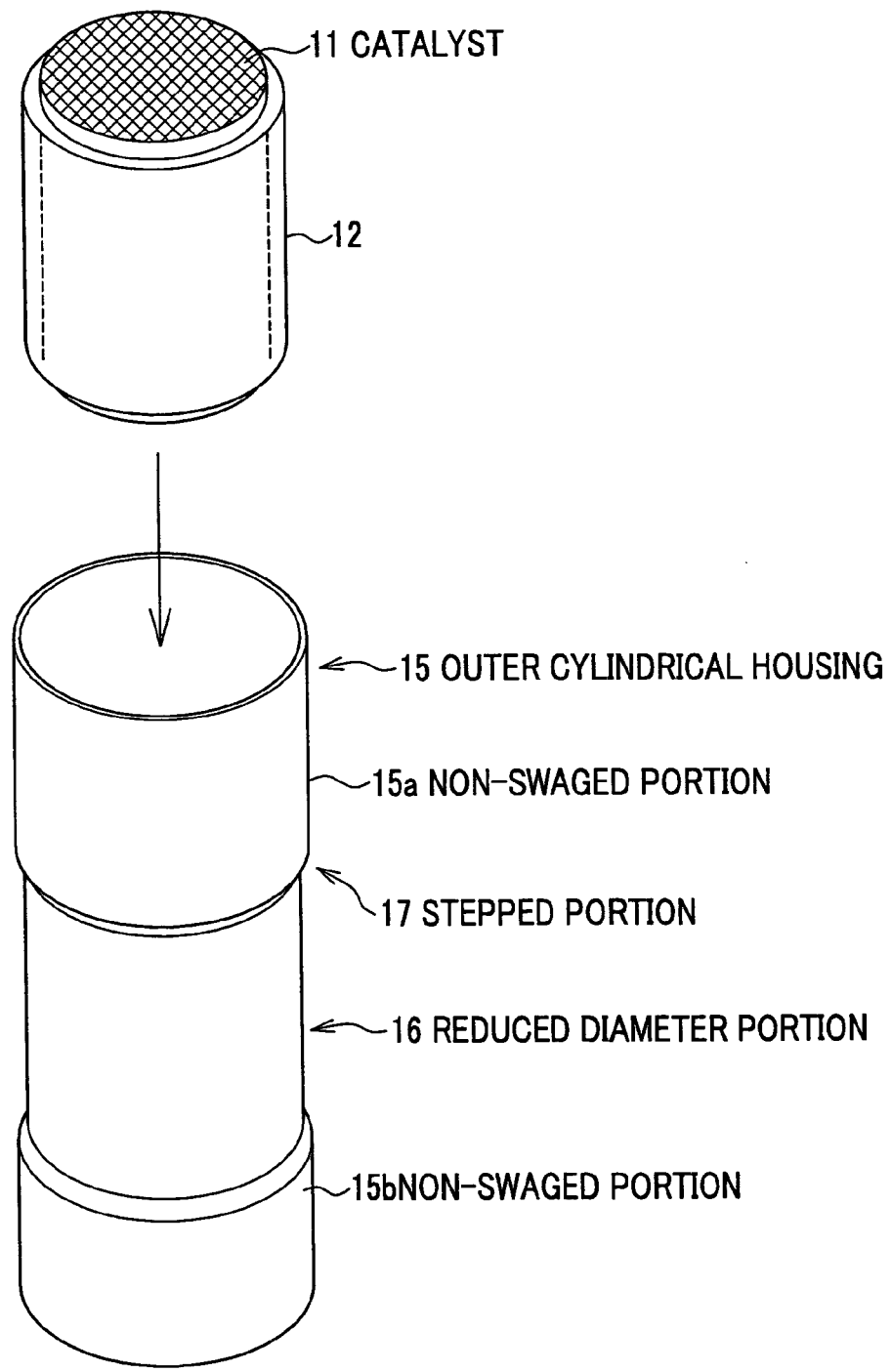
FIG. 7 is a perspective view explaining the press-fitting process for press-fitting the catalyst during the manufacture of the catalytic converter.

Further, as shown in FIG. 7, the catalytic converter 10 may be manufactured using an outer cylindrical housing 15 which has been pre-swaged.

The outer cylindrical housing 15 is provided with a reduced diameter portion 16 as a pre-swaged portion relative to the swaging process at a part where the catalyst 11 is fixed. Accordingly, the outer cylindrical housing 15 is provided with the reduced diameter portion 16 and non-swaged portions 15a, 15b, and between the reduced diameter portion 16 and the non-swaged portion 15a is formed a stepped portion 17 having a funnel-shaped inclined surface.

Press-fitting the catalyst 11 into this outer cylindrical housing 15 is carried out according to the following procedures. In this press-fitting process, it is possible to press-fit the catalyst 11 without using the enlarged diameter member 30 as described above.

Figure 8:
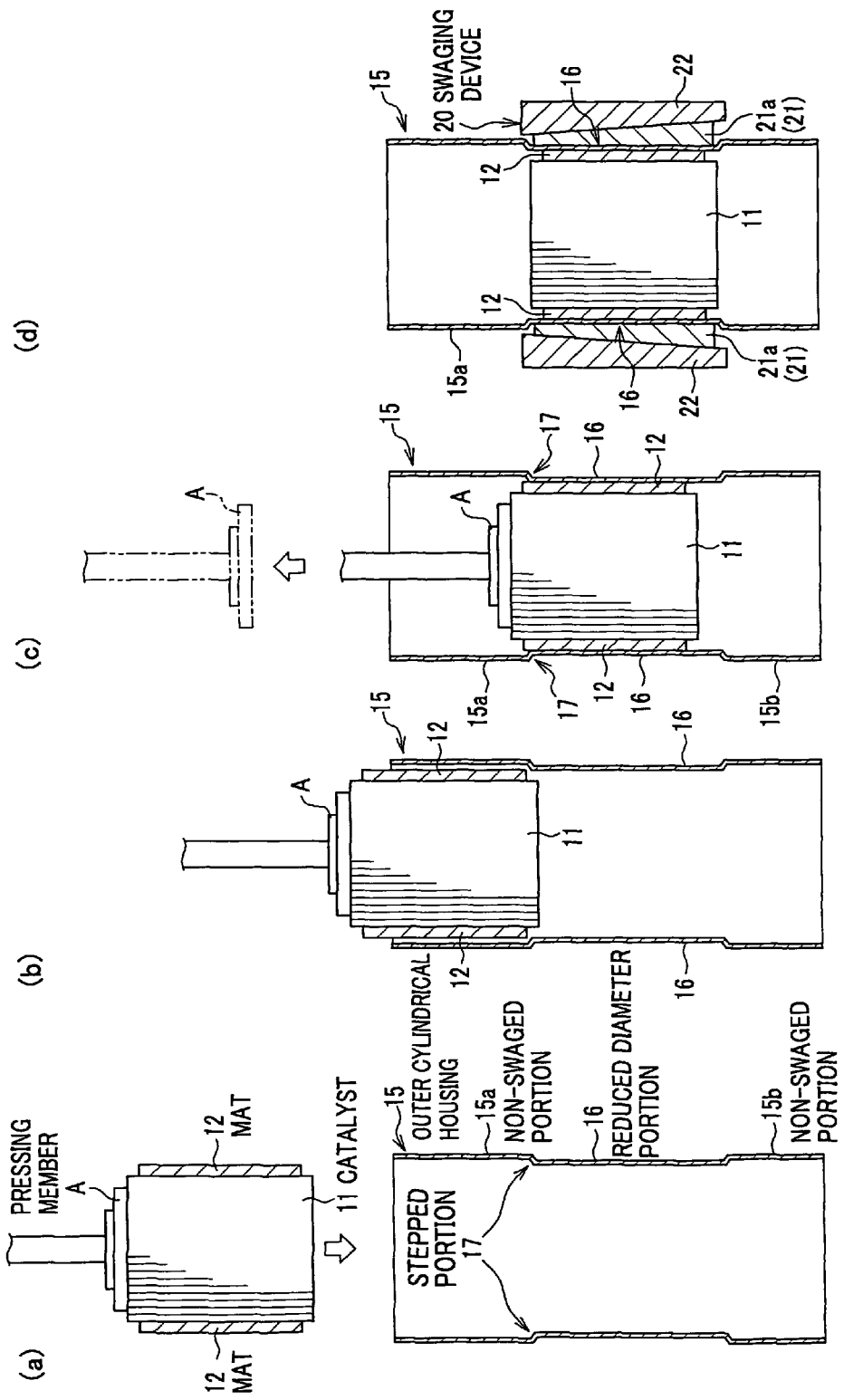
FIGS. 8(a) through 8(d) are schematic sectional views explaining the press-fitting process.

At first, as shown in FIG. 8(a), the catalyst 11 around which the mat 12 has been wrapped is inserted from the opening of the outer cylindrical housing 15, for instance, by a manual operation. Next, the pressing member A of the pressing device (not shown) is lowered toward the catalyst 11 until the bottom surface of the pressing member A closely contacts with the upper surface of the catalyst 11. As shown in FIG. 8(b), the pressing member A is further lowered. The catalyst 11 is pressed and moved downward within the outer cylindrical housing 15, and as seen in FIG. 8(c), the catalyst 11 comes in the position just before the rear end portion of the mat 12 enters from the stepped portion 17 into the reduced diameter portion 16 as seen in the press-fitting direction of the catalyst 11. At this time, the pressing force of the pressing member A is detected as one peak value by the load cell (not shown) (detecting step), and the peak value of the pressing force is stored in the memory by the controller C (see FIG. 5(b)). Based on this detected pressing force, calculation is made on the diameter reduction, by which the clearance value between the outer cylindrical housing 15 and the catalyst 11 is set to the desired target value (calculating step). Thereafter, as shown in FIG. 8(d), the fingers 21a of the swaging die 21 of the swaging device 20 abut against the reduced diameter portion 16, and the fingers 21a are driven in the swaging direction for a predetermined distance, so that the swaging process is carried out to reduce the diameter for the predetermined amount by the swaging die 21 and the swaging collar 22.

As described above, since the pre-swaging step provides a fixing part of the outer cylindrical housing, at which the catalyst is supported (reduced diameter portion 16), in advance of press-fitting the catalyst 11 with a small diameter reduction than the diameter reduction in the swaging step, it is possible to decrease time required for the swaging process after the press-fitting of the catalyst 11. Further, the catalyst 11 is press-fitted into the outer cylindrical housing 15, which is similar to the state where the swaging process is applied, and therefore it is possible to more reliably detect the pressing force.

Furthermore, the detection of the pressing force by the detecting step is carried out at a position just before the rear end portion of the catalyst 11 enters from the stepped portion 17 formed in the pre-swaging step into the reduced diameter portion 16, and therefore the pressing force having substantially the peak value upon press-fitting can be detected. This can simplify the detecting method for detecting the pressing force when compared with the system which, for instance, always detects the pressing force throughout the press-fitting operation. Therefore, reduction of the cost can be achieved.

Such a reduced diameter portion 16 is not always necessary, and even in an outer cylindrical housing without this reduced diameter portion 16, the pressing force can be detected properly. This can be achieved by temporarily stopping the press-fitting operation while the catalyst 11 is being press-fitted into the outer cylindrical housing (press-fitting step), and thereafter by restarting this temporarily stopped press-fitting operation to re-press-fit the catalyst 11 (re-press-fitting step). The pressing force upon re-press-fitting the catalyst 11 is then detected (detecting step). According to this manufacturing method, the press-fitting operation of the catalyst 11 is temporarily stopped by the press-fitting step, and thereafter this temporarily stopped press-fitting operation is restarted by the re-press-fitting step and at this time the detection of the pressing force is carried out. This enables the pressing force to be detected in a state where the property of the outer cylindrical housing is reflected. Therefore, it is possible to obtain the diameter reduction, which is close to the value in the actual mounting state.

Further, since the detection of the pressing force by the detecting step is carried out at the re-press-fitting step, there is no need to detect the pressing force until the re-press-fitting step. This makes it possible to provide a manufacturing method with excellent detection efficiency. Therefore, when compared with the system which always detects the pressing force throughout the press-fitting operation, it is possible to simplify the detecting method for detecting the pressing force. Therefore, reduction of the cost can be achieved.

Figure 9:
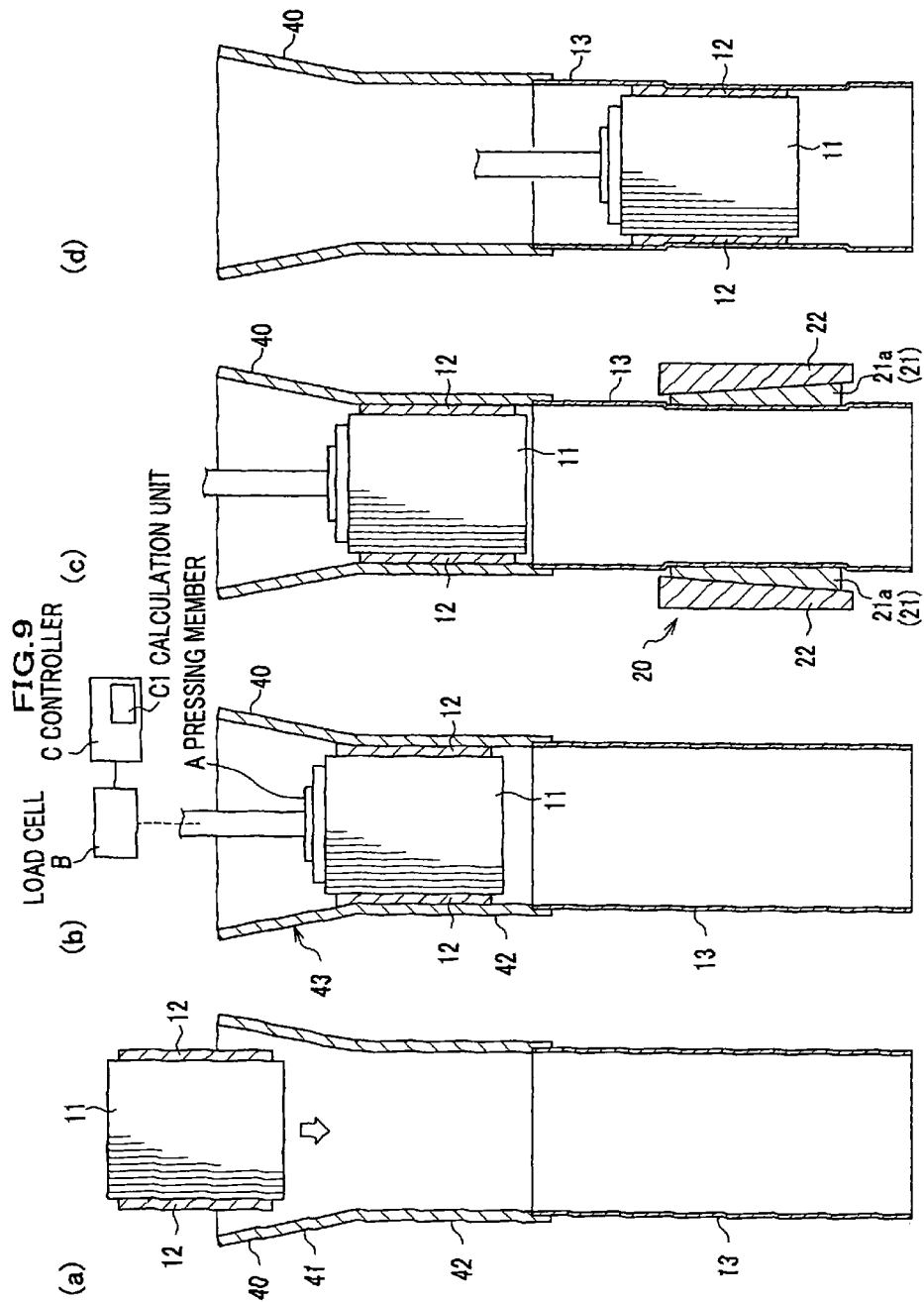
FIGS. 9(a) through 9(d) are schematic sectional views explaining another press-fitting process.

As shown in FIGS. 9(a) to 9(d), the catalytic converter may be manufactured using an enlarged diameter member 40 whose cylindrical portion 42 is formed longer. The enlarged diameter member 40 used in this manufacturing method is formed such that the cylindrical portion 42 has a sufficient length to receive and support the substantially entire length of the catalyst 11. During the press-fitting operation of the catalyst 11, as shown in FIG. 9(b), the catalyst 11 is substantially entirely supported in the cylindrical portion 42 at a time when the catalyst 11 is press-fitted to the position where the pressing force substantially takes the peak value. In this state, the pressing force is detected.

When the diameter reduction is calculated based on this detected pressing force, the swaging process using the swaging device 20 is carried out (see FIG. 9(c)) with the catalyst 11 positioned in the cylindrical portion 42 of the enlarged diameter member 40. Thereafter, the catalyst 11 is press-fitted into the swaged outer cylindrical housing 13 using the pressing device A (see FIG. 9(d)).

With the use of this enlarged diameter member 40, a stable press-fitting of the catalyst 11 is achieved. Further, since the cylindrical portion 42 is formed to have a length such that at least the entire length of the catalyst 11 is received, the catalyst 11 is received and supported in the cylindrical portion 42 of the enlarged diameter member 40 when the pressing force is detected, thereby preventing the catalyst 11 form entering into the outer cylindrical housing 13. Therefore, the detection of the pressing force is hardly subject to dispersion of the outer cylindrical housings 13, and the pressing force on which dispersion of the catalyst and the mat is relatively accurately reflected can be obtained. Therefore, it is possible to obtain a highly accurate diameter reduction.

Further, even if the catalyst 11 is press-fitted after swaging the outer cylindrical housing 13, the same effects can be obtained as with the case in which the outer cylindrical housing 13 is swaged after press-fitting the catalyst 11.

Since the calculation of the diameter reduction is carried out continuously after the press-fitting operation of the catalyst, it is possible to eliminate a conventional time-consuming work such as separating and carrying out the measuring operation from a series of operations for the manufacturing process.

Figure 10:
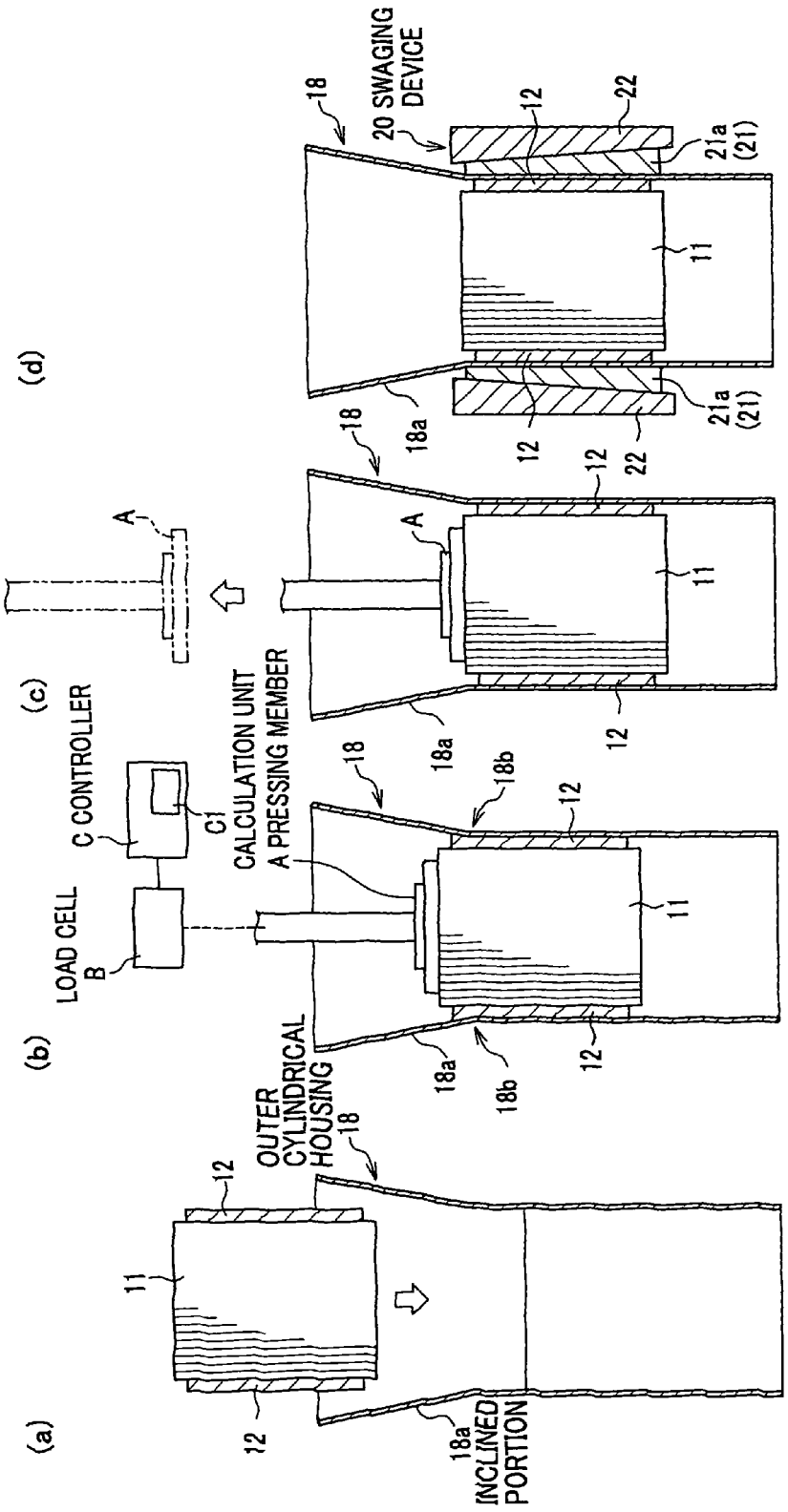
FIG. 10(a) through 10(d) are schematic sectional views explaining another press-fitting process.

Further, as shown in FIGS. 10(a) to 10(d), the upper portion of the outer cylindrical housing 18 may be processed to form an inclined portion 18a which is integral with the outer cylindrical housing 18. In this outer cylindrical housing 18, as shown in FIG. 10(a), the catalyst 11 is inserted, for example by a manual operation, into the outer cylindrical housing 18. Thereafter, as shown in FIG. 10(b), the pressing force is detected by the detecting step at a position just before the rear end portion of the mat 12 enters into a bent portion 18b of the inclined portion 18a as viewed in the press-fitting direction of the catalyst 11. After the press-fitting of the catalyst 11 (see FIG. 10(c)), the swaging process is carried out by the swaging device 20 as shown in FIG. 10(d).

According to this manufacturing method, since the press-fitting operation of the catalyst 11 and the detection of the pressing force by the detecting step are carried out using the inclined portion 18a which is integrally formed with the outer cylindrical housing 18, there is no need to require an additional operation such as attaching a separate enlarged diameter member to the outer cylindrical housing 18, which can simplify the operation upon press-fitting the catalyst 11. Diameter of the inclined portion 18a can be reduced, for instance, by the spinning process.

While the present invention has been described in detail with reference to preferred embodiments thereof, the present invention is not limited to these specific embodiments and various changes and modifications may be made without departing from the scope of the attached claims.

For example, the catalyst 11 may be wrapped with the mat 12, the outer surface of which is further attached to a sheet made of PP (polypropylene) or PET (polyethylene terephthalate). Interposing the sheet between the mat 12 and the enlarged diameter member 30, 40 enables to stabilize the pressing force upon detecting the pressing force by the pressing device A. This is because the binder contained in the mat 12 adheres to the enlarged diameter member 30, 40, preventing an occurrence of dispersion in friction coefficient upon detecting the pressing force. Further, when compared with a case in which the mat 12 is attached to a sheet made of paper, the sheet made of PP or PET is hardly affected by moisture, the detection of the pressing force can be performed in a more stable manner.

When in use of the catalytic converter 10, the sheet is lost or melts by the exhaust heat.

Figure 11:
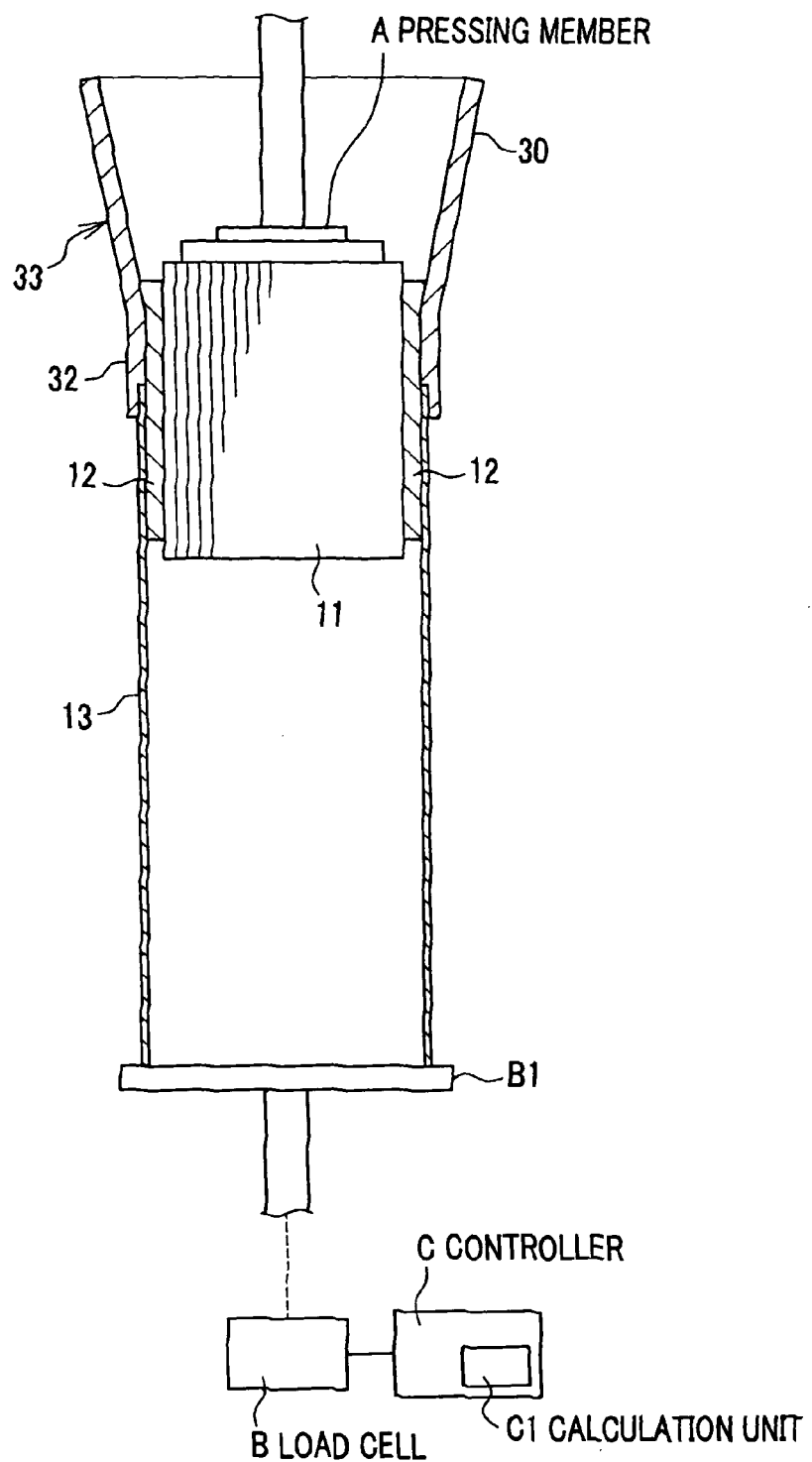
FIG. 11 is a schematic sectional view explaining another operation for detecting the pressing force.

According to the above-described embodiments, the counterforce of the pressing force is detected by the load cell B (see FIG. 5(b)) attached to the pressing device A. However, the present invention is not limited to this specific arrangement. For example, as shown in FIG. 11, a receiving portion B1 may be provided at a lower end of the outer cylindrical housing 13 and the load cell B may be arranged below the receiving portion B1 to detect the pressing force of the pressing member A.

Figure 12:
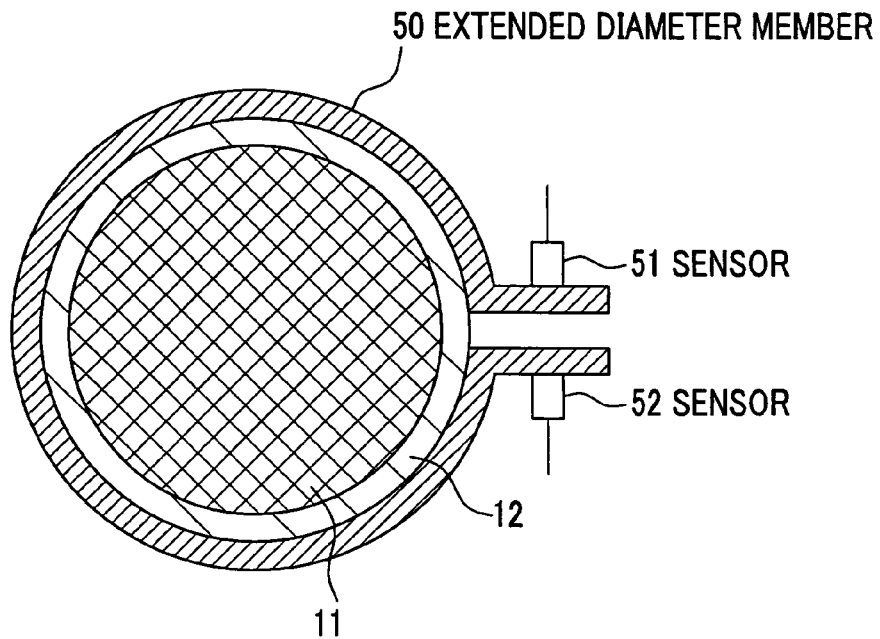
FIG. 12 is a schematic sectional view explaining another operation for detecting the pressing force.

Further, as shown in FIG. 12, the enlarged diameter member 50 may be formed to have a C-shaped cross-section, and by employing sensors 51, 52, it is possible to detect a force (pressure) which expands the enlarged diameter member 50 from the cut end portions upon receipt of the pressing force at the time of press-fitting. In this instance, one of these sensors 51, 52 may be omitted and the side where the sensor is omitted may be fixed to a structure or the like. Therefore, the force which expands the enlarged diameter member 50 may be detected by the sensor 51 (52) that is arranged at one side.

Figure 13:
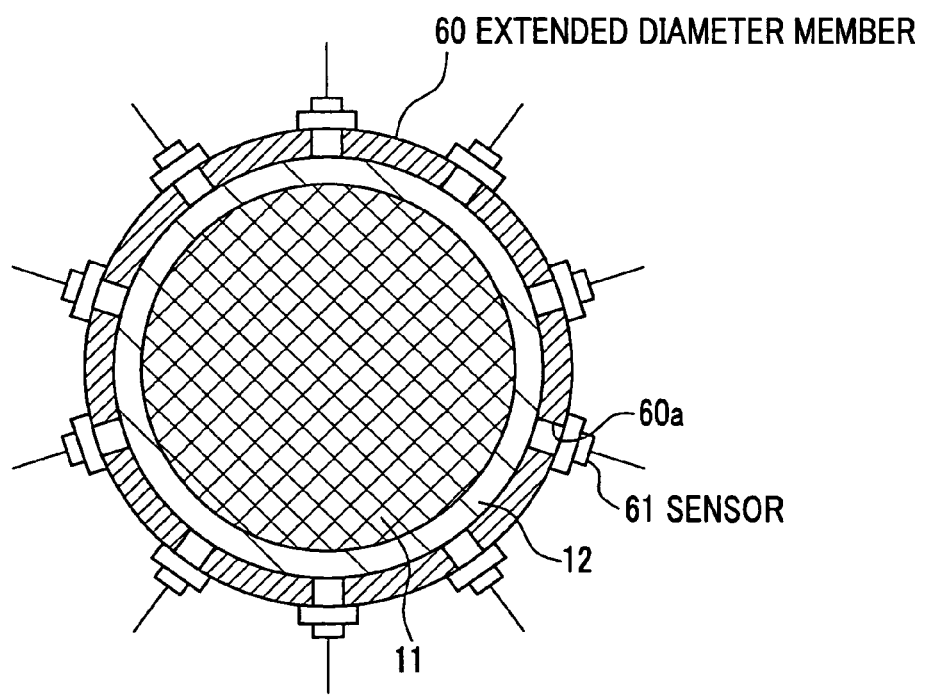
FIG. 13 is a schematic sectional view explaining another operation for detecting the pressing force.
Figure 14:
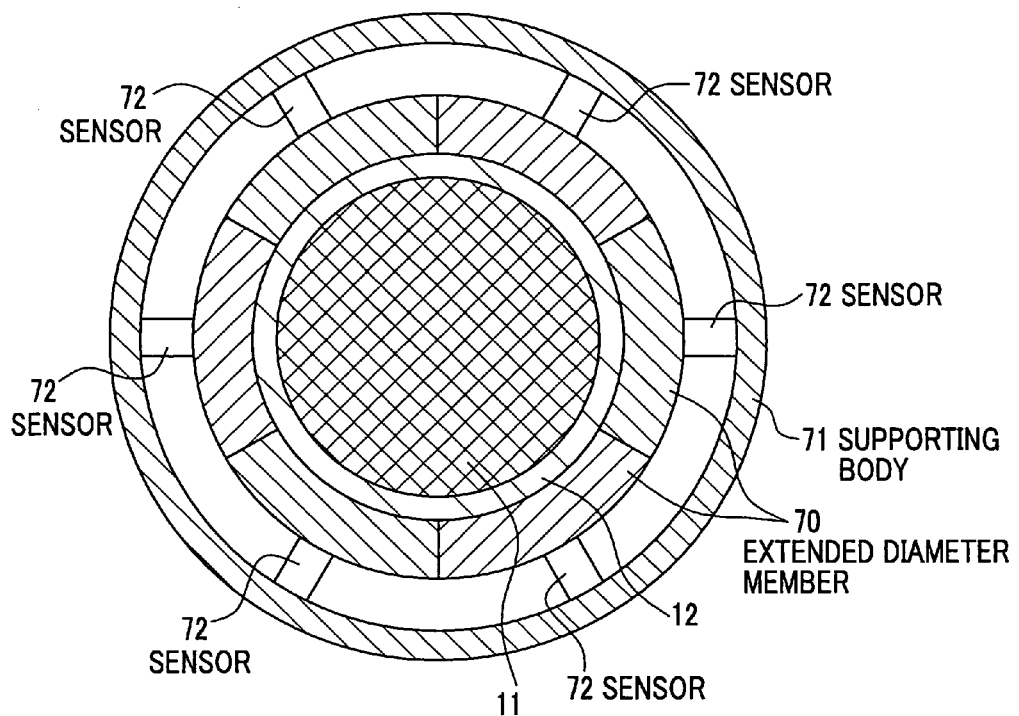
FIG. 14 is a schematic sectional view illustrating a modified embodiment of the operation as shown in FIG. 13.

Further, as shown in FIG. 13, a plurality of through openings 60a may be formed in the peripheral wall of the enlarged diameter member 60 with predetermined space intervals, and a sensor 61 may be attached to each through opening 60a, so as to detect the pressing force (surface pressure) of the catalyst 11 (mat 12) to be press-fitted. Further, in this instance, a plurality of sensors 61 may be provided at plurality of stages as viewed in the press-fitting direction so that the pressing force can be detected in a step-by-step basis. Furthermore, as shown in FIG. 14, the enlarged diameter member may consist of a plurality of divided members 70, each of which is provided with a sensor 72 for detecting the pressing force. These divided enlarged diameter members 70 may be supported inside an integral supporting body 71 so that the sensors 72 detect the pressing force. In this instance, the area to which the sensors 72 can detect (i.e., area on which the sensors 72 abut) can be advantageously increased.

The present invention can also provide a controlling method which includes a determination step for determining whether or not the catalyst 11 is supported by a predetermined mat packing density in the catalytic converter 10 manufactured according to the above manufacturing method.

To be more specific, the catalyst 11 is press-fitted into the outer cylindrical housing 13 according to the manufacturing method as shown in FIG. 5, and thereafter, the swaging process is performed by the swaging device 20 as shown in FIG. 6. Further, the pressing device A re-presses the catalyst 11 within the swaged outer cylindrical housing 13, so as to check acceptance/rejection of the catalytic converter 10 as to whether the catalyst 11 is supported in a predetermined mat packing density range or whether the catalyst 11 satisfies a criterion as a critical value for the mat packing density for the purpose of controlling the products.

As another embodiment of the controlling method, it is possible to detect the pressing force of the pressing device A and check the acceptance/rejection of the catalytic converter 10, after the outer cylindrical housing 13 is swaged (see FIG. 9(c)) and when the pressing device A press-fits the catalyst 11 into the swaged outer cylindrical housing 13 (see FIG. 9(d)).

According to this controlling method, the mat packing density after swaging can be calculated by utilizing the correlation between the pressing force of the pressing device A and the mat packing density, and the control can be performed based on this calculated value. Since the manufacture of the catalytic converters 10 and the control for the products can be carried out in a series of processes, time and cost required for controlling the products can be reduced.

EXAMPLE

An example according to the present invention will be described below.

As catalysts to be used, columnar honeycomb-shaped ceramic catalysts were prepared, each of which was 118 mm in length and 118.4 mm (actual measurement values: $\phi$117.1-119.7 mm) in outer diameter. As mats used for these catalysts, mat materials prepared from alumina fibers using binder were prepared.

Figure 15:
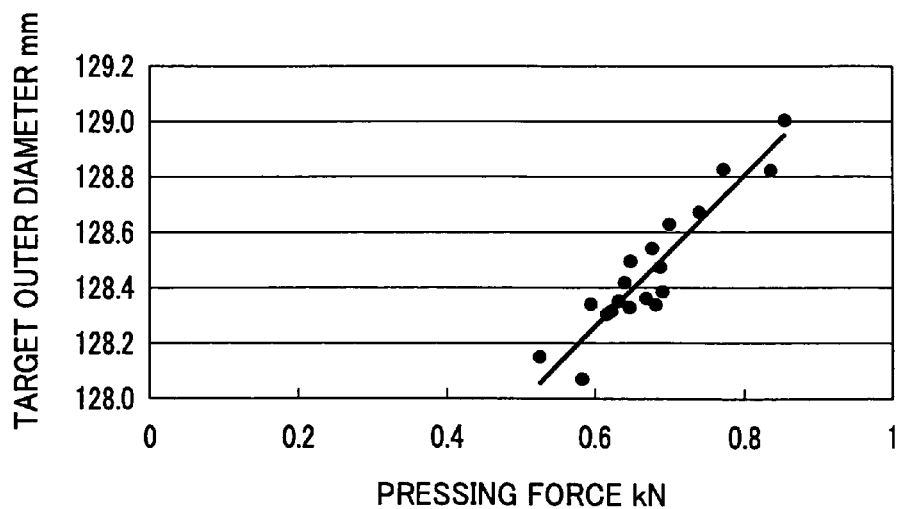
FIG. 15 is a graph showing the relation between target outer diameter and pressing force.

The catalyst around which the mat had been wrapped was press-fitted into the outer cylindrical housing the funnel-shaped enlarged diameter member, and the counterforce in accordance with this pressing force was detected by the load cell, to thereby measure the pressing force upon press-fitting. FIG. 15 is a graph showing the relation between measurement value (eighteen samples) of the pressing force (kN) of the catalyst having 118 mm length and target outer diameter (mm). As shown by the solid line in the figure, the relation between pressing force (kN) and target outer diameter (mm) was obtained from measurement values. On the basis of this obtained relation, the diameter reduction corresponding to the pressing force was calculated, and accordingly the catalytic converter was manufactured. Data according to this manufacturing method are shown in Table 1. As a comparative example, data are shown for the catalytic converters manufactured by the conventional manufacturing method, in which the outer diameter of the product was determined based on the outer diameter of the catalyst, and the manufacture of the catalytic converter was made by swaging the outer cylindrical housing with the target clearance for satisfying the desired packing density GBD.

TABLE 1

| | Manufacturing after calculation of the diameter reduction from the pressing force | | Manufacturing by the conventional method with the predetermined target clearance | |
|---|---|---|---|---|
| | Outer diameter of Outer cylindrical housing after swaging process is carried out (mm) | Packing Density GDB (g/cm$^3$) | Outer diameter of Outer cylindrical housing after swaging process is carried out (mm) | Packing Density GDB (g/cm$^3$) |
| Average | 128.46 | 0.33 | 128.38 | 0.34 |
| Max | 128.96 | 0.33 | 128.70 | 0.36 |
| Min | 128.06 | 0.33 | 128.15 | 0.33 |
| Difference | 0.91 | 0.01 | 0.55 | 0.03 |

As shown by Table 1, according to the catalytic converters manufactured with the target packing density of 0.33 g/cm$^3$ and by calculating the diameter reduction from the pressing force, all the converters show a favorable packing density.

What is claimed is:

1. A method of manufacturing a catalytic converter a catalyst whose outer peripheral surface is wrapped with a mat, and an outer cylindrical housing which includes at least a reduced-diameter portion to support therein the catalyst and the mat, the method comprising the steps of:
   providing a pressing device, and thereby press-fitting the catalyst and the mat into the outer cylindrical housing along a longitudinal direction of the outer cylindrical housing;
   a detecting step of detecting a longitudinal pressing force at a time when at least a portion of the catalyst is within an enlarged-diameter portion of the outer cylindrical housing while the pressing device is pressing the catalyst and the mat in the longitudinal direction into the outer cylindrical housing;
   a determining step of determining a diameter reduction of the outer cylindrical housing, by which a clearance value between the outer cylindrical housing and the catalyst is set to a desired target value, as a function of the longitudinal pressing force detected by the detecting step; and
   a swaging step of reducing a diameter of the outer cylindrical housing based on the diameter reduction calculated by the determining step.

2. The method as claimed in claim 1, wherein the outer cylindrical housing is swaged in the swaging step after the catalyst is press-fitted into the outer cylindrical housing.

3. The method as claimed in claim 2, wherein the press-fitting of the catalyst is carried out using a funnel-shaped enlarged diameter member, and wherein the detection of the pressing force by the detecting step is carried out by detecting a pressing force upon press-fitting the catalyst into the reduced-diameter portion.

4. The method as claimed in claim 3, wherein the enlarged diameter member comprises an inclined portion, and the reduced-diameter portion includes a cylindrical portion having a straight inner surface which continuously extends from the inclined portion, and wherein the detection of the pressing force by the detecting step is carried out at a position just before a rear end portion of the mat enters from the inclined portion into the cylindrical portion as viewed in a press-fitting direction of the catalyst.

5. The method as claimed in claim 4, wherein the cylindrical portion is formed to have a length such that at least an entire length of the catalyst is received therein.

6. The method as claimed in claim 4, wherein the press-fitting direction of the catalyst is the longitudinal direction.

7. The method as claimed in claim 2, wherein the detection of the pressing force by the detecting step is carried out by detecting a pressing force of the catalyst after the catalyst is press-fitted into the outer cylindrical housing.

8. The method as claimed in claim 2, further comprising a pre-swaging step for providing a reduced diameter portion on the outer cylindrical housing by a swaging process, in which swaging is performed with a smaller diameter reduction than the diameter reduction in the swaging step, and for providing an inclined stepped portion between this reduced diameter portion and a non-swaged portion, and wherein the detection of the pressing force by the detecting step is carried out at a position just before a rear end portion of the mat enters from the stepped portion into the reduced diameter portion as viewed in a press-fitting direction of the catalyst.

9. The method as claimed in claim 2, further comprising a press-fitting step for temporarily stopping a press-fitting operation after the catalyst is entirely press-fitted inside the outer cylindrical housing, and a re-press-fitting step for restarting the press-fitting operation temporarily stopped by the press-fitting step and re-press-fitting the catalyst, and wherein the detection of the pressing force by the detecting step is carried out in the re-press-fitting step.

10. The method as claimed in claim 2, wherein the calculation of the diameter reduction by the calculating step is carried out based on data which are previously set in accordance with kinds of mats, catalysts, and outer cylindrical housings.

11. The method as claimed in claim 2, wherein the calculation of the diameter reduction by the calculating step is carried out based on a peak value of the pressing force detected by the detecting step at a predetermined insertion position.

12. The method as claimed in claim 2, wherein a sheet made of polypropylene or polyethylene terephthalate is attached to an outer surface of the mat.

13. The method as claimed in claim 1, wherein the catalyst is press-fitted into the outer cylindrical housing after the outer cylindrical housing is swaged.

14. The method as claimed in claim 1, further comprising:
   controlling a plurality of the catalytic converters for checking on acceptance/rejection of each catalytic converter, by including in the determining step; and
   pressing the catalyst in the swaged outer cylindrical housing to determine whether or not the catalyst is supported by a predetermined packing density.

15. The method as claimed in claim 14, wherein the determining step is carried out after the catalyst is press-fitted into the outer cylindrical housing.

16. The method as claimed in claim 14, wherein the determination step is carried out after the outer cylindrical housing is swaged and in the process of press-fitting the catalyst into the outer cylindrical housing.

17. The method as claimed in claim 14, wherein a sheet made of polypropylene or polyethylene terephthalate is attached to an outer surface of the mat.

18. The method as claimed in claim 1, wherein the longitudinal direction is substantially parallel to an axis of the outer cylindrical housing.

* * * * *